United States Patent [19]

Iwasaki et al.

[11] Patent Number: 5,704,837
[45] Date of Patent: Jan. 6, 1998

[54] VIDEO GAME STEERING SYSTEM CAUSING TRANSLATION, ROTATION AND CURVILINEAR MOTION ON THE OBJECT

[75] Inventors: Goro Iwasaki, San Jose, Calif.; Nobuyuki Aoshima, Yokohama, Japan; Kazushige Watanabe, Sagamihara, Japan; Hiroshi Igarashi, Yokohama, Japan

[73] Assignee: Namco Ltd., Tokyo, Japan

[21] Appl. No.: 343,503

[22] PCT Filed: Mar. 25, 1994

[86] PCT No.: PCT/JP94/00483

§ 371 Date: Dec. 9, 1994

§ 102(e) Date: Dec. 9, 1994

[87] PCT Pub. No.: WO94/22544

PCT Pub. Date: Oct. 13, 1994

[30] Foreign Application Priority Data

Mar. 26, 1993 [JP] Japan .................................. 5-92142

[51] Int. Cl.⁶ .......................................... A63F 9/24
[52] U.S. Cl. .................... 463/38; 463/50; 463/2
[58] Field of Search ....................... 463/2, 6, 7, 8, 463/36, 37, 38, 33, 31, 50; 434/69; 273/438, 433, 148 B; 395/137; 345/161, 122

[56] References Cited

U.S. PATENT DOCUMENTS

| | | |
|---|---|---|
| 4,116,444 | 9/1978 | Mayer et al. . |
| 4,475,132 | 10/1984 | Rodesch . |
| 4,895,376 | 1/1990 | Chiang Shiung-Fei ............ 463/2 |
| 4,976,438 | 12/1990 | Tashiro et al. .................... 463/2 |
| 5,067,167 | 11/1991 | Berger ....................... 395/129 X |
| 5,299,810 | 4/1994 | Pierce et al. ..................... 463/2 |
| 5,396,267 | 3/1995 | Bouton ........................ 345/168 |

OTHER PUBLICATIONS

Rapid Fire Brochure by Bally Pinball Division noted in Play Meter, Jul. 01, 1982, pp. 56.

*Primary Examiner*—Jessica Harrison
*Assistant Examiner*—Michael O'Neill
*Attorney, Agent, or Firm*—Oliff & Berridge

[57] ABSTRACT

A video game system for playing a game while controlling a movable game object. A player operates first and second steering units 12, 14 with his or her right and left hands to input first and second propulsion vectors for first and second propulsion units in the movable game object. A steering information computing unit 30 is responsive to the first and second propulsion vectors to compute direction and rotation information indicating in how direction and manner the movable game object having the first and second propulsion units moves. These direction and rotation information are output as a steering signal. A game computing means 40 is responsive to the steering signal for computing the game so that the movable game object moves within a game space. This is indicated on a display 44.

16 Claims, 32 Drawing Sheets

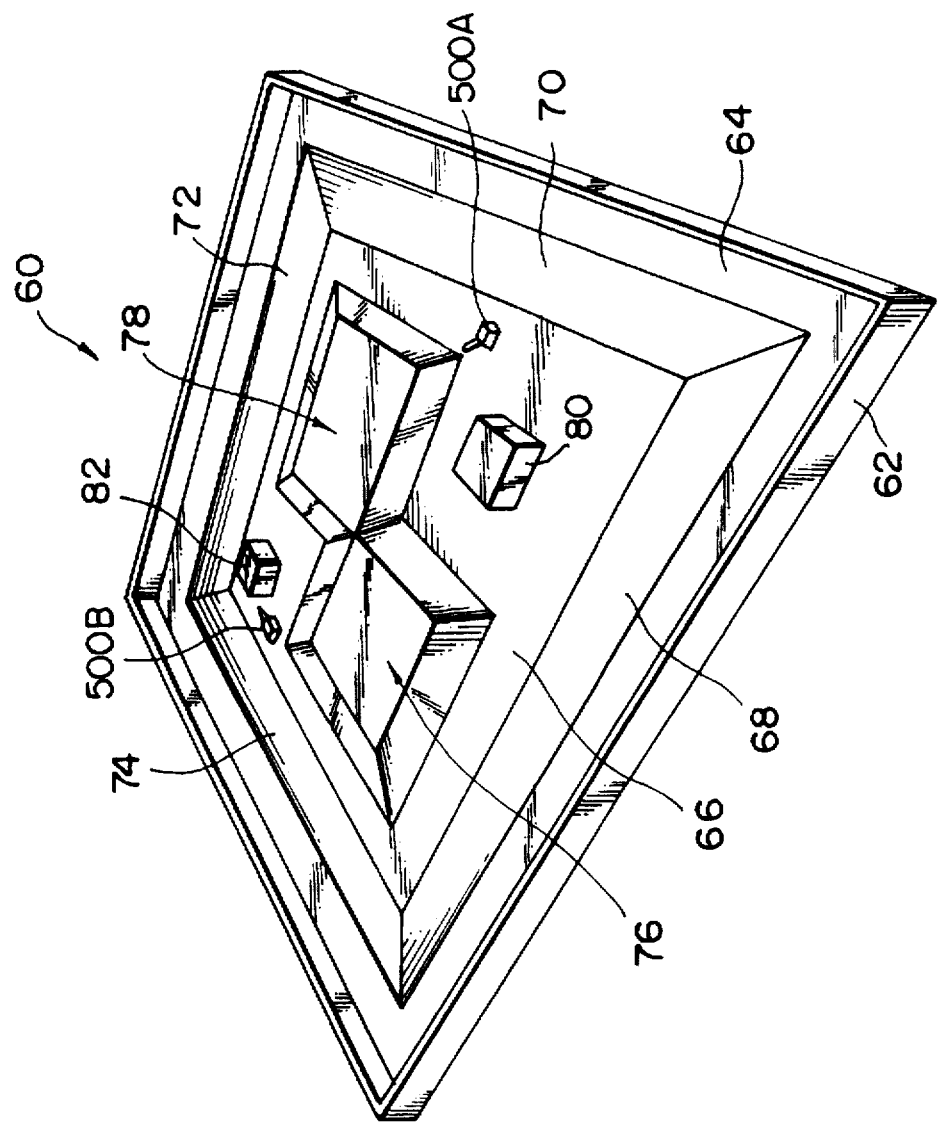

$V_{XO} = V_{XA} + V_{XB}$ $V_{YO} = V_{YA} + V_{YB}$ $V_{\theta O} = V_{\theta A} + V_{\theta B} = (rV_{YA}) + (-rV_{YB})$
$= r(V_{YA} - V_{YB})$

FIG. 14

| INDEX | X | Y | Z | $\theta$ | $\phi$ | $\rho$ |
|---|---|---|---|---|---|---|
| 0 | $X_0$ | $Y_0$ | $Z_0$ | $\theta_0$ | $\phi_0$ | $\rho_0$ |
| 1 | $X_1$ | $Y_1$ | $Z_1$ | $\theta_1$ | $\phi_1$ | $\rho_1$ |
| 2 | $X_2$ | $Y_2$ | $Z_2$ | $\theta_2$ | $\phi_2$ | $\rho_2$ |
| 3 | $X_3$ | $Y_3$ | $Z_3$ | $\theta_3$ | $\phi_3$ | $\rho_3$ |
| 4 | $X_4$ | $Y_4$ | $Z_4$ | $\theta_4$ | $\phi_4$ | $\rho_4$ |
| 5 | $X_5$ | $Y_5$ | $Z_5$ | $\theta_5$ | $\phi_5$ | $\rho_5$ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| n | $X_n$ | $Y_n$ | $Z_n$ | $\theta_n$ | $\phi_n$ | $\rho_n$ |

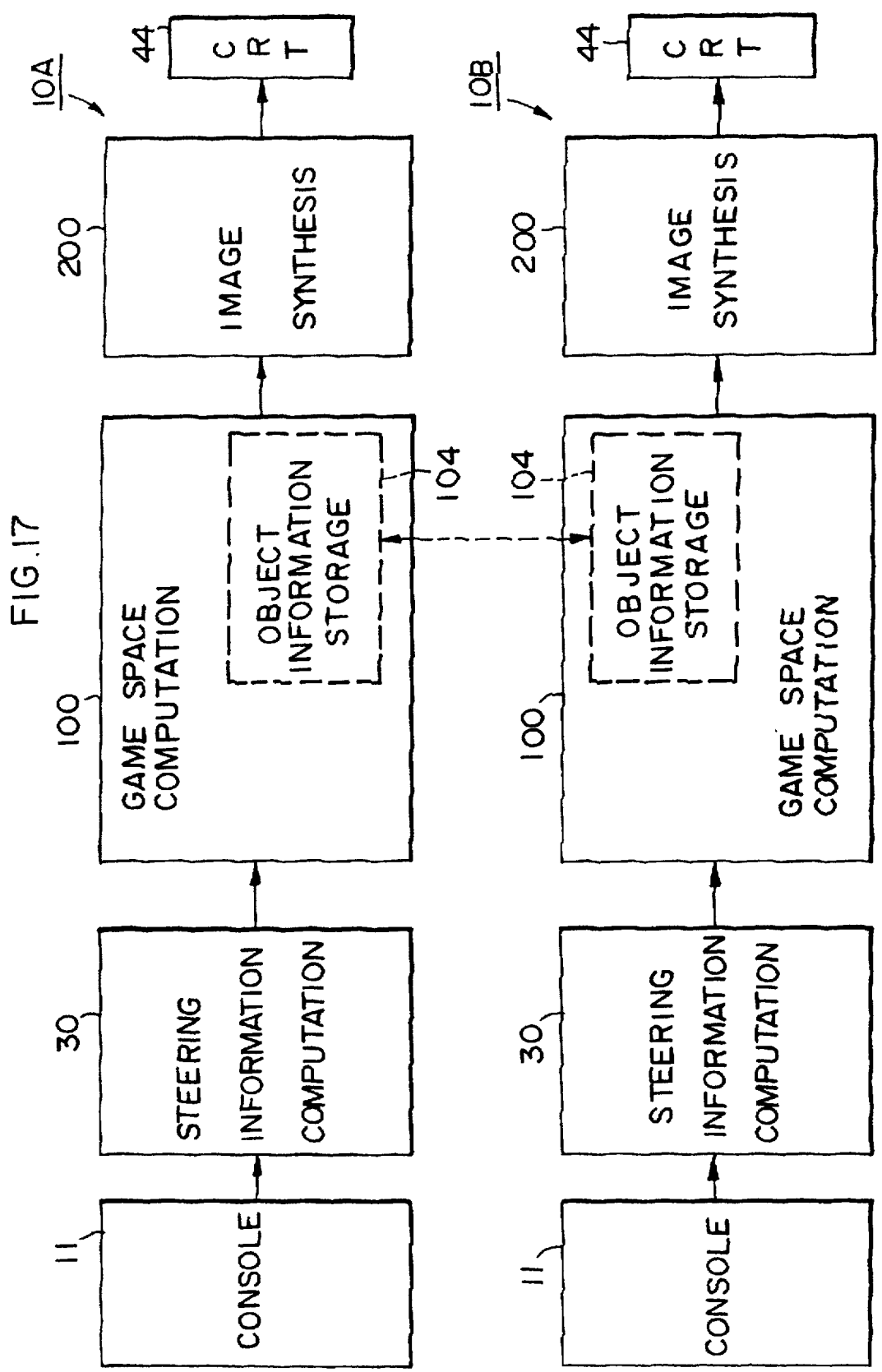

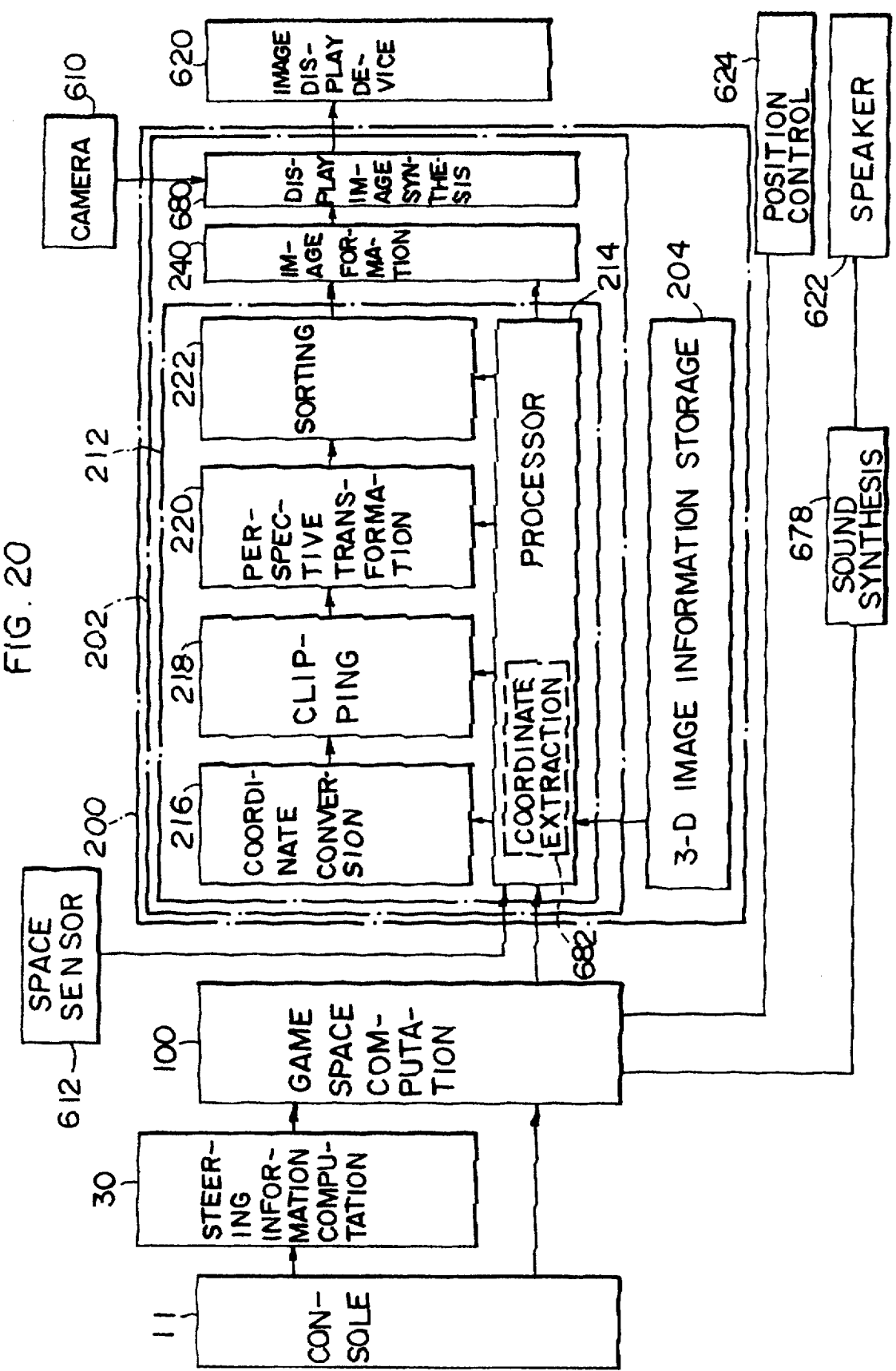

FIG.27A
GAME FIELD AREA
FIG.27B
INTER-AREA BLOCK AREA
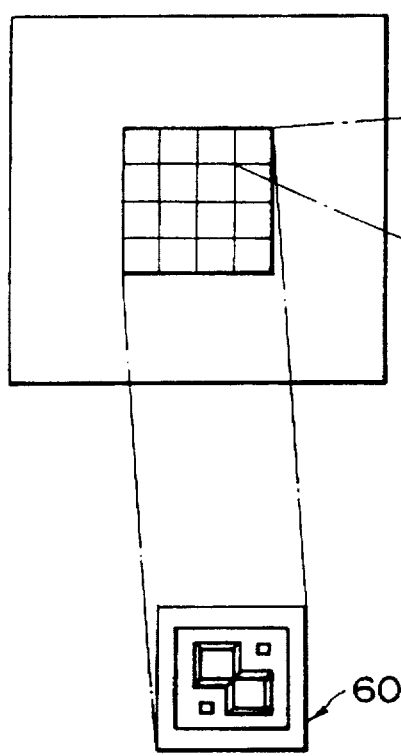
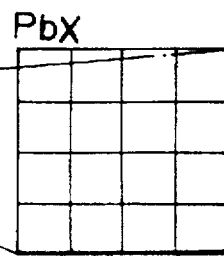
PbX
FIG.27C
TOPOGRAPHIC BLOCK AREA
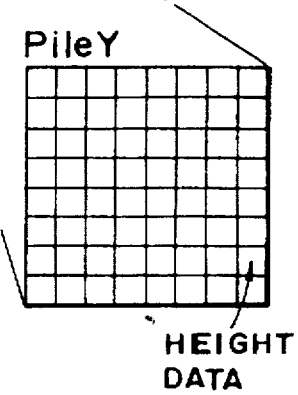
PileY
60
HEIGHT DATA dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00 dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,17,18,19,20,00,00,00,00,00,00
dc.b 00,00,00,00,00,00,21,22,23,24,00,00,00,00,00,00 dc.b 00,00,00,00,00,00,25,26,27,28,00,00,00,00,00,00
dc.b 00,00,00,00,00,00,29,30,31,32,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00 dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00
dc.b 00,00,00,00,00,00,00,00,00,00,00,00,00,00,00,00

```
;pile115
dc.w    160,160,160,160,160,160,160,160,160
dc.w    160,160,160,160,160,160,160,160,160
dc.w    160,160,160,160,160,160,160,160,160
dc.w    160,160,160,160,160,160,160,160,160
dc.w    160,160,160,160,160,160,160,160,160
dc.w    160,160,160,160,160,160,160,160,160
dc.w    160,160,160,160,160,160,160,160,160
dc.w    160,160,160,160,160,160,160,160,160
dc.w    160,160,160,160,160,160,160,160,160
;pile116
dc.w    010,030,050,070,090,110,130,150,160
dc.w    010,030,050,070,090,110,130,150,160
dc.w    010,030,050,070,090,110,130,150,160
dc.w    010,030,050,070,090,110,130,150,160
dc.w    010,030,050,070,090,110,130,150,160
dc.w    010,030,050,070,090,110,130,150,160
dc.w    010,030,050,070,090,110,130,150,160
dc.w    010,030,050,070,090,110,130,150,160
dc.w    010,030,050,070,090,110,130,150,160
;pile117
dc.w    010,010,010,010,010,010,010,010,010
dc.w    030,030,030,030,030,030,030,030,030
dc.w    050,050,050,050,050,050,050,050,050
dc.w    070,070,070,070,070,070,070,070,070
dc.w    090,090,090,090,090,090,090,090,090
dc.w    110,110,110,110,110,110,110,110,110
dc.w    130,130,130,130,130,130,130,130,130
dc.w    150,150,150,150,150,150,150,150,150
dc.w    160,160,160,160,160,160,160,160,160
;pile118
dc.w    150,130,110,090,070,050,030,010,000
dc.w    150,130,110,090,070,050,030,010,000
dc.w    150,130,110,090,070,050,030,010,000
dc.w    150,130,110,090,070,050,030,010,000
dc.w    150,130,110,090,070,050,030,010,000
dc.w    150,130,110,090,070,050,030,010,000
dc.w    150,130,110,090,070,050,030,010,000
dc.w    150,130,110,090,070,050,030,010,000
dc.w    150,130,110,090,070,050,030,010,000
;pile119
dc.w    150,150,150,150,150,150,150,150,150
dc.w    130,130,130,130,130,130,130,130,130
dc.w    110,110,110,110,110,110,110,110,110
dc.w    090,090,090,090,090,090,090,090,090
dc.w    070,070,070,070,070,070,070,070,070
dc.w    050,050,050,050,050,050,050,050,050
dc.w    030,030,030,030,030,030,030,030,030
dc.w    010,010,010,010,010,010,010,010,010
dc.w    000,000,000,000,000,000,000,000,000

;pile120
dc.w    010,030,050,070,090,110,130,150,160
dc.w    030,030,050,070,090,110,130,150,160
dc.w    050,050,050,070,090,110,130,150,160
dc.w    070,070,070,070,090,110,130,150,160
dc.w    090,090,090,090,090,110,130,150,160
dc.w    110,110,110,110,110,110,130,150,160
dc.w    130,130,130,130,130,130,130,150,160
dc.w    150,150,150,150,150,150,150,150,160
dc.w    160,160,160,160,160,160,160,160,160
;pile121
dc.w    150,130,110,090,070,050,030,010,010
dc.w    150,130,110,090,070,050,030,030,030
dc.w    150,130,110,090,070,050,050,050,050
dc.w    150,130,110,090,070,070,070,070,070
dc.w    150,130,110,090,090,090,090,090,090
dc.w    150,130,110,110,110,110,110,110,110
dc.w    150,130,130,130,130,130,130,130,130
dc.w    150,150,150,150,150,150,150,150,150
dc.w    160,160,160,160,160,160,160,160,160
;pile122
dc.w    150,150,150,150,150,150,150,150,150
dc.w    150,130,130,130,130,130,130,130,130
dc.w    150,130,110,110,110,110,110,110,110
dc.w    150,130,110,090,090,090,090,090,090
dc.w    150,130,110,090,070,070,070,070,070
dc.w    150,130,110,090,070,050,050,050,050
dc.w    150,130,110,090,070,050,030,030,030
dc.w    150,130,110,090,070,050,030,010,010
dc.w    150,130,110,090,070,050,030,010,000
;pile123
dc.w    150,150,150,150,150,150,150,150,160
dc.w    130,130,130,130,130,130,130,150,160
dc.w    110,110,110,110,110,110,130,150,160
dc.w    090,090,090,090,090,110,130,150,160
dc.w    070,070,070,070,090,110,130,150,160
dc.w    050,050,050,070,090,110,130,150,160
dc.w    030,030,050,070,090,110,130,150,160
dc.w    010,030,050,070,090,110,130,150,160
dc.w    010,030,050,070,090,110,130,150,160
```

FIG.30

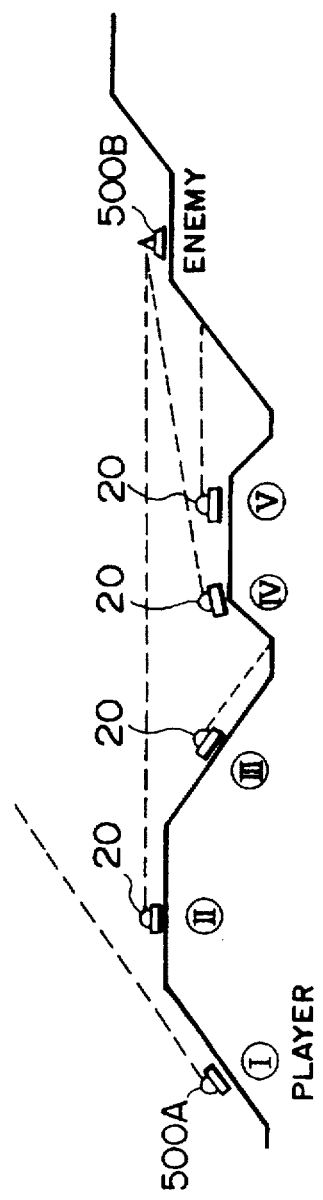

VIDEO GAME STEERING SYSTEM CAUSING TRANSLATION, ROTATION AND CURVILINEAR MOTION ON THE OBJECT

BACKGROUND OF THE INVENTION

1. Field of the Invention

The present invention relates to a video game system and particularly to a video game system in which a player can steer a movable object displayed on a display to move it within a predetermined game space.

2. Description of the Related Art

There are known video game systems which computes and displays game images so that a movable object used in the game is controlled by a player to move within a predetermined game space.

In such video game systems, various steering devices are used depending on the type of a movable object. If a movable object is a vehicle such as motorcar or the like, for example, a steering wheel is used. If a movable object is an airplane or helicopter, a control stick or the like is used.

In such steering devices of the prior art, the movement of the movable object within the game space is limited to obstruct the interest of the game.

As shown in FIG. 25, a video game which uses two tanks 1110 and 1112 controlled by two players and moved about within a game space 1000 while avoiding obstacles 1114 and attacking on each other is now assumed. In the game system of the prior art, the players can only control their tanks to advance, reverse and turn them. For such a reason, the attack and defense patterns are limited to obstruct the interest of the game. This raises a problem in that the players is easily tired of the game.

Even though one of the players knows the enemy tank 1112 lying in wait behind an obstacle 1114 as shown in FIG. 26, that player can attack the enemy tank 1112 only when his own tank 1110 turns and moves to an appropriate position 1110B. Therefore, his tank 1110 may frequently be attacked and defeated by the enemy tank as at a position 1110A on the way of turning.

Particularly, such game machines can easily become monotony with lack of the feel of speed and be get tired by the players since the game machines cannot move the movable objects to do a complicated motion such as translation or rotation.

In such a prior art game machine that uses a control stick or the like to control an airplane or helicopter, the control stick can laterally move to translate the movable object, but cannot turn or rotate it.

Thus, the game machines of the prior art lacks the interest of the game since they cannot move the movable object to do complicated motions such as turn, translation, rotation and the like, in addition to forward and backward motions, within the game space.

To overcome such problems, it is believed that a steering mechanism for causing the movable object to do various complicated motions may be developed. However, such a steering mechanism may produce an extremely complicated game suitable only for skilled players. This raises a problem in that the game machine cannot be enjoyed by beginners. In game machines for business use, it is important that they can be broadly played with pleasure by all the players ranging from beginners to skilled players. Therefore, a game machine requiring any complicated steering operation is not suitable for business use.

In view of such problems in the prior art, it is an object of the present invention to provide a video game machine in which a movable game object can do complicated motions in simple operation and be broadly played with pleasure by all the players ranging from beginners to skilled players.

Another object of the present invention is to provide a shooting type video game system in which the movable object can do complicated motions in simple operation so that it will aim at and attack an enemy or target and avoid the enemy's attack.

SUMMARY OF THE INVENTION

To this end, the present invention provides a video game system comprising:

steering means operated by a player for steering a movable game object which includes first and second propulsion units moving within an angle range of 360 degrees; and game computing means responsive to steering signals from said steering means for computing the game so that the movable object can move within a game space and be reflected on a display, said steering means also including:

a first steering unit operated by the player with his or her right hand to input a first propulsion vector to said first propulsion unit within the angle range of 360 degrees according to the direction of player's operation;

a second steering unit operated by the player with his or her left hand to input a second propulsion vector to said second propulsion unit within the angle range of 360 degrees according to the direction of player's operation; and a steering information computing unit responsive to said first and second propulsion vectors for computing and outputting information of the directions of propulsion and rotation for the movable object as steering signals, whereby the combination of operation by right and left hands of the player can steer said movable object so that it will move and rotate within said game space in all the direction.

To accomplish said another object, the present invention provides a video game system comprising:

steering means operated by a player for steering a movable game object which includes first and second propulsion units moving within an angle range of 360 degrees;

shooting means operated by the player for shooting at an enemy or target; and game computing means responsive to steering signals from said steering means and actuating signals from said shooting means for computing the game in which the movable object can move within a game space and can shoot at the enemy or target and for displaying the game on a display;

said steering means also including:

a first steering unit operated by the player with his or her right hand to input a first propulsion vector to said first propulsion unit within the angle range of 360 degrees according to the direction of player's operation;

a second steering unit operated by the player with his or her left hand to input a second propulsion vector to said second propulsion unit within the angle range of 360 degrees according to the direction of player's operation; and a steering information computing unit responsive to said first and second propulsion vectors for computing and outputting information of the directions of propulsion and rotation for the movable object as steering signals, whereby the combination of operation by right and left hands of the player can steer said movable object so that it will move and rotate within said game space in all the direction to aim at the enemy or target with the help of a sight.

The sight for aiming the enemy or target is displayed in front of the movable game object on the display.

The steering information computing unit may include a direction computing unit responsive to the first and second propulsion vectors for computing information about the direction of propulsion of the movable object and a rotation computing unit responsive to the first and second propulsion vectors for computing information about rotation of the movable object.

The steering information computing unit may be responsive to the first and second propulsion vectors for computing the direction and force of propulsion as said information about direction of propulsion and for computing the direction and force of rotation as said information about rotation.

The first and second steering units may be formed to input the first and second propulsion vectors to the first and second propulsion units depending on the amount of operation.

Each of the first and second steering units is preferably in the form of a first steering lever for the right hand or a second steering lever for the left hand which is pivotally supported for inclination from a given reference position to any direction and adapted to input a propulsion vector to the first or second propulsion unit according to the direction and amount of inclination.

Moreover, the video game system may be formed to comprise a steering direction detector means which detects X-axis and Y-axis coordinate components based on the direction and angle of inclination of each of said first and second steering levers when the X-axis and Y-axis represent the lateral and longitudinal directions, respectively, with the same positive orientation in both the steering levers, setting the magnitude of input for X-axis or Y-axis by each of the steering levers on the reference position as 0, and which outputs first and second propulsion vectors $V_B$ and $V_A$ for said first and second propulsion units respectively, corresponding to detected X-axis and Y-axis coordinate components, said first and second propulsion units being arranged symmetrically about the movable object, said steering information computing unit being operative to determine the center position of each of said propulsion units as a reference point 0, the lateral direction as X-axis, and the longitudinal direction as Y-axis and to set the directions of X-axis and Y-axis corresponding to the positive orientation in the respective steering levers as the directions of positive coordinate axes, said direction computing unit being operative to use the propulsion velocity components $V_{XB}$, $V_{XA}$ and $V_{YB}$, $V_{YA}$ of the first and second propulsion vectors $V_B$ and $V_A$ acting on the respective propulsion units in the X-axis and Y-axis directions, to compute the propulsion velocity components $V_{XO}$, $V_{YO}$ of the movable object in the X-axis and Y-axis directions which are in turn output as information about the direction of propulsion, according to the following equations:

$$V_{XO} = V_{XA} + V_{XB}$$

$$V_{YO} = V_{YA} + V_{YB},$$

and said rotation computing unit being operative to use the absolute value, r, of the X-coordinate in each of the propulsion units and the first and second propulsion vectors to compute the rotation angular velosity $V_{\theta O}$ in the rotating movable object which is in turn output as information of rotation, according to the following equation:

$$V_{\theta O} = r(V_{YA} - V_{YB}).$$

The game computing means is preferred to comprise:

game space computing means responsive to a preset game program and the steering signals from said steering information computing unit for computing a game in which a player is to control the movable object within a virtual three-dimensional (3-D) game space; and image synthesizing means for computing a view image of the virtual 3-D game space viewed from the movable object, and for synthesizing and displaying a pseudo 3-D image on the display, whereby the player can play a 3-D game in which he or she operates the steering means and moves the movable object within the virtual 3-D game space while viewing the pseudo 3-D image.

In the video game system of the present invention, the player operates the first steering unit with his or her right hand and the second steering unit with his or her left hand to input the first and second propulsion vectors to the first and second propulsion units, respectively.

The first and second steering units provide the first and second propulsion vectors within the range of 360 degrees depending on the direction of player's operation.

The steering information computing unit responds to the first and second propulsion vectors to compute in what direction and manner the movable object having the first and second propulsion units moves and rotates, as information about the directions of propulsion and rotation which will be output as steering signals.

The game computing means responds to the steering signals to compute and display the game on the display such that the movable game object moves a given game space.

In such a manner, the player can operate the video game system of the present invention by use of his or her right and left hands in combination so that the movable object will be moved and rotated in all the directions with its complicated motion.

If the first and second steering units are operated by the player in the same direction, the movable object will move in that direction of operation while maintaining its present attitude. If the first and second steering units are simultaneously operated forwardly, the movable object will move in the forward direction. If the first and second steering units are simultaneously operated laterally, the movable object will move in the lateral direction. Thus, the movable object can move in all the directions, forward, backward, oblique and lateral directions.

If the first and second steering units are operated differently in the direction and amount of operation, the first and second propulsion vectors can be different in direction to provide a rotational force to the movable object to turn or rotate about its own rotational axis. If one of the first and second steering units is operated forwardly with the other steering unit being operated backwardly, the movable object will be rotated about its own rotational axis. On the other hand, if only one of the first and second steering units is operated forwardly, the movable object will be turned with a radius depending on that propulsion vector.

According to the present invention, thus, the operation of the player's right and left hands in combination can move the movable object in a complicated motion. Particularly, by inputting the first and second propulsion vectors to the first and second propulsion units in the movable object depending on the direction of operation in the first and second steering units, the movable object can be moved substantially with a human's feel and easily operated by any beginner. Thus, the present invention can provide a video game system which can simply be played by any player ranging from beginners to skilled players with a speedy and varied manner.

According to the present invention, particularly, any beginner can simply and easily be matured to control the movable object since he or she can control the movable object substantially with a human's feel. Therefore, the beginner can shorten time required to become familiar with the video game system, which would always raise a problem when the player first encounters the video game system. The video game system of the present invention can be played even by any beginner and is very suitable for use in video games for business use.

If the present invention is applied to a shooting game, a player can move the movable object within the game space to take pleasure in a more strategic and speedy manner as he or she pleases.

More particularly, the simple operation of the first and second steering units can cause the movable object to move with a complicated motion including the forward, backward, turning and rotating movements controlled by the players when he or she is to attack enemies or targets moving within the game space and to defend his or her movable object from the enemy's attacks. If the present invention is applied to a shooting game and particularly a shooting game in which a plurality of players compete with each other, various strategies can be planned. This improves the shooting game in variation and interest.

In the game system of the present invention, the game space computing means may further include an object information storage unit for storing at least information about the 3-D position and direction of a 3-D object of the movable image as object information, a landform information storage unit for storing information about landform of a ground on which the movable object moves within the virtual 3-D space, and an object information changing unit for reading the object information of the movable object from said object information storage unit to change it by the use of the landform information read out from said landform information storage unit. Furthermore, the image synthesizing means may comprise a 3-D image information storage unit for storing 3-D image information of 3-D objects for defining the game space and 3-D objects appearing in the 3-D game space and an image computing unit for using the object information from said object information storage unit and the 3-D image information from said 3-D image information storage unit to compute view images of the game space which are viewed from the movable object disposed in said virtual 3-D space and to synthesize the pseudo 3-D image to be output, said pseudo 3-D image reflecting the landform information.

In such an arrangement, the object information of the movable object is changed by the object information changing unit, utilizing the landform information. Thus, the pseudo 3-D image reflecting the landform information can be formed. In such a case, at least two landform information sensors may be provided to the movable object to form the pseudo 3-D image reflecting the landform information.

In the game system of the present invention, the movable object may be formed to launch a projectile in response to the actuating signal input by the player through the shooting means. The game space computing means may include a projectile processing unit for processing the projectile launched from the movable object. The projectile processing unit may include a projectile movement computing unit responsive to the object information of the movable object changed by the object information changing unit and also the actuating signal from said shooting means.

In such a case, it is preferred that the object information storage unit is operative to store the object information of a target and that the projectile processing unit includes a hit judgment unit responsive to the position of the projectile computed by the projectile movement computing unit and the object information of the target stored in the object information storage unit for judging whether or not the projectile hits on the target.

In such an arrangement, the changed object information of the movable object can be utilized to compute the position of the projectile and to judge whether or not the projectile hits on the target.

The video system of the present invention may further comprise a player's space sensor for sensing the 3-D information about the player within the actual 3-D space. The display may be formed to cover the visual field of the player and to be mounted on the player's head. The image synthesizing means may include a coordinate extracting unit responsive to a detection signal from the player's space sensor for extracting the position and direction information of the player within the virtual 3-D game space, such that the view images of the player within the virtual 3-D game space can be computed to display the pseudo 3-D image on the display.

In such an arrangement, virtual reality can easily be realized.

In such a case, the system of the present invention may comprise image pick-up means on the player for taking the actual space image viewed by the player. The image synthesizing means may include a display image synthesizing unit for combining the view images of the player within the virtual 3-D space with the actual space image taken by said image pick-up means. A pseudo 3-D image formed from these combined images may be displayed on the display.

In such an arrangement, a virtual reality more approximating reality can be represented.

The system of the present invention may further comprise a vehicle body located in the actual space for actually receiving the player, the vehicle body including a position control unit for controlling the position of the player in responsive to the landform information. By controlling the position of the vehicle body, thus, the player can virtually experience the feel as if the player boards on an actual vehicle which reflects the landform information.

BRIEF DESCRIPTION OF DRAWINGS

FIG. 14 is a diagram showing the object information stored in the object information storage unit.

FIG. 17 is a diagram showing the formation of a multi-player type game.

FIG. 20 is a block diagram of other embodiments of a video game system constructed in accordance with the present invention.

FIGS. 27A, 27B and 27C are conceptual diagrams illustrating a hierarchical structure of landform information.

FIGS. 28A and 28B are conceptual diagrams illustrating a hierarchical structure of landform information.

FIG. 30 is a conceptual diagram illustrating a hierarchical structure of landform information.

FIGS. 31A and 31B are schematic views illustrating a landform information sensor provided to the movable object.

FIG. 33 is a schematic view illustrating a status of attack reflecting the landform.

DETAILED DESCRIPTION OF THE PREFERRED EMBODIMENTS

The present invention will now be described by way of example with reference to the drawings.

(1) First Embodiment

Figure 2:
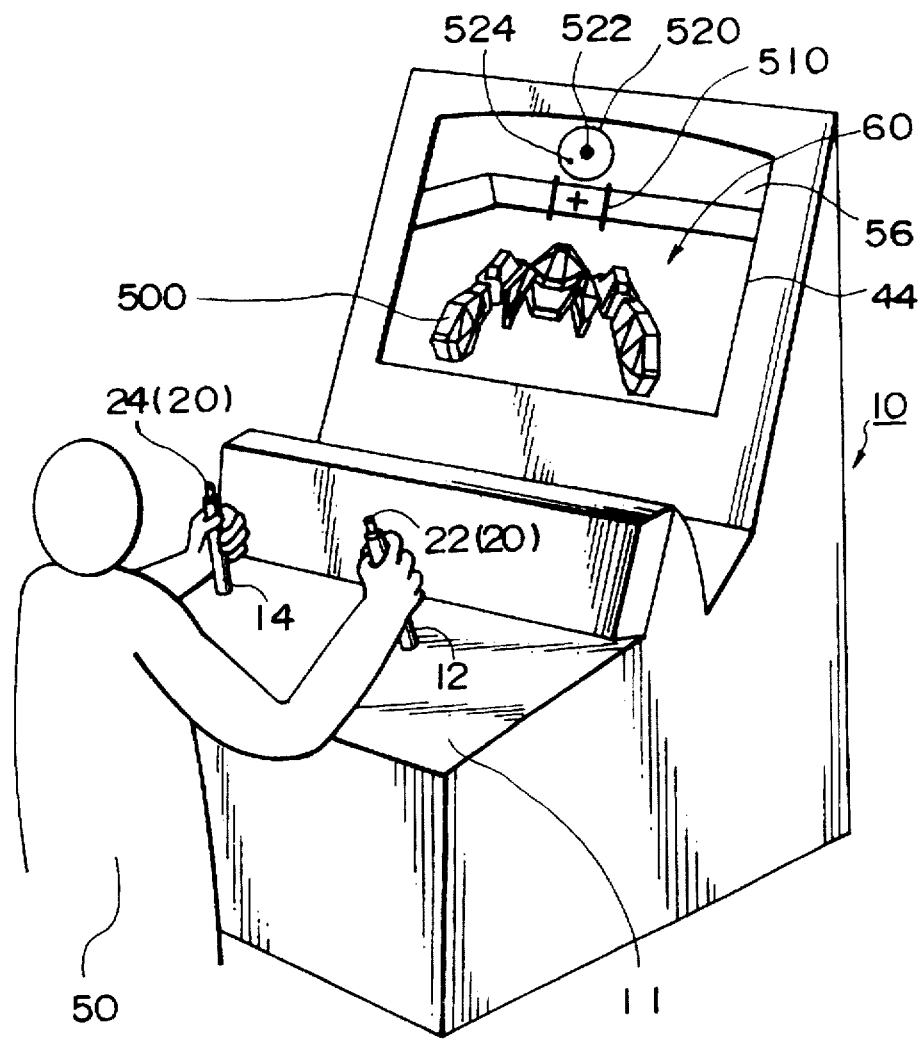
FIG. 2 is a perspective view of the appearance of the video game system of the embodiments of the present invention.

FIG. 2 shows a preferred video game system 10 constructed in accordance with the present invention. The video game system 10 includes a display 44 located in front of a player 50 and a console 11 which the player 50 can operate while viewing the display 44.

The video game system 10 may be modified for performing any one of various games, if required. It will be described herein that the video game system 10 is applied to a 3-D game.

The 3-D game system 10 of the first embodiment can provide a game in which a virtual 3-D game space is formed by a preset game program, a movable object controlled by the player freely moving around within the virtual 3-D space.

The 3-D game of the first embodiment is a future tank war game which is played in an early future city composed of various races. In this future tank war game, many fighters gather in the city to win a huge prize money and fight with each other within a square game field which is enclosed by walls and from which any fighter cannot escape. Each of the fighters will fight with the other fighters to win a championship, using his own future tank. The player 50 plays the game as one of such fighters.

As shown in FIG. 2, the player 50 controls a movable object, that is, a future tank 500, projected onto the display 44, by operating right- and left-hand steering levers 12 and 14 on the console 11. More particularly, the player 50 can control the future tank 500 to freely move around in a play field 60 which is set within the virtual 3-D game space.

The console 11 also includes a shooting unit 20 operated by the player to attack targets. Such a shooting unit 20 may include a trigger button 22 for a machine gun which can be fired without limitation, and another trigger button 24 for a missile launcher which is a powerful weapon for launching missiles in a limited number. These trigger buttons 22 and 24 are mounted on the steering levers 12 and 14, respectively. The display 44 reflects a scene in which the future tank 500 controlled by the player 50 and its sight 510 are located centrally. The player 50 aims at and attacks an enemy through the sight 510. The display 44 also reflects an enemy-tracking radar 520 indicating the position of the enemy which is a target. Thus, the player 50 can know the enemy's position 524 relative to his or her own position 522.

Figure 3I:
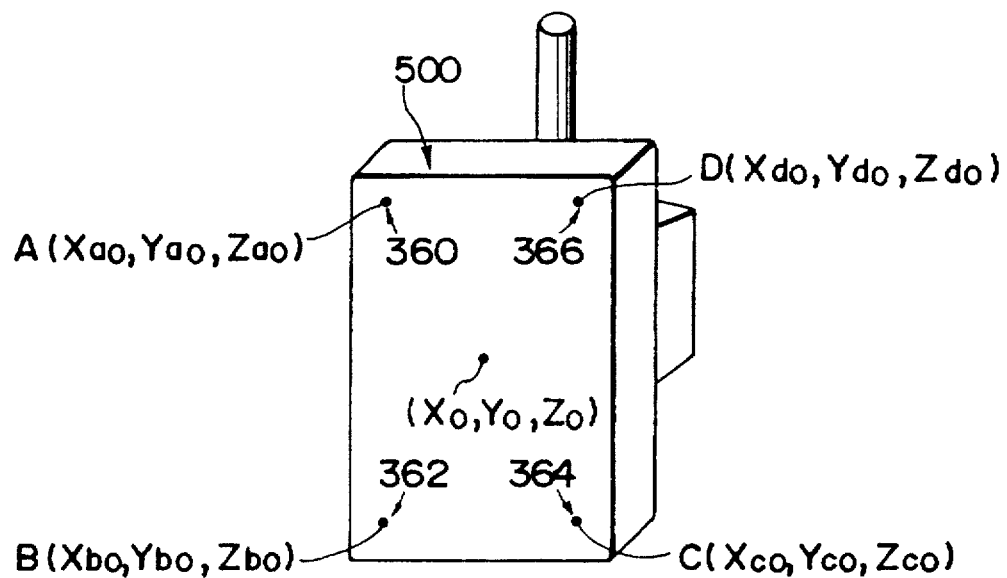
FIG. 3 is a schematic view showing the game field in the video game system of the embodiments of the present invention.
Figure 3I:
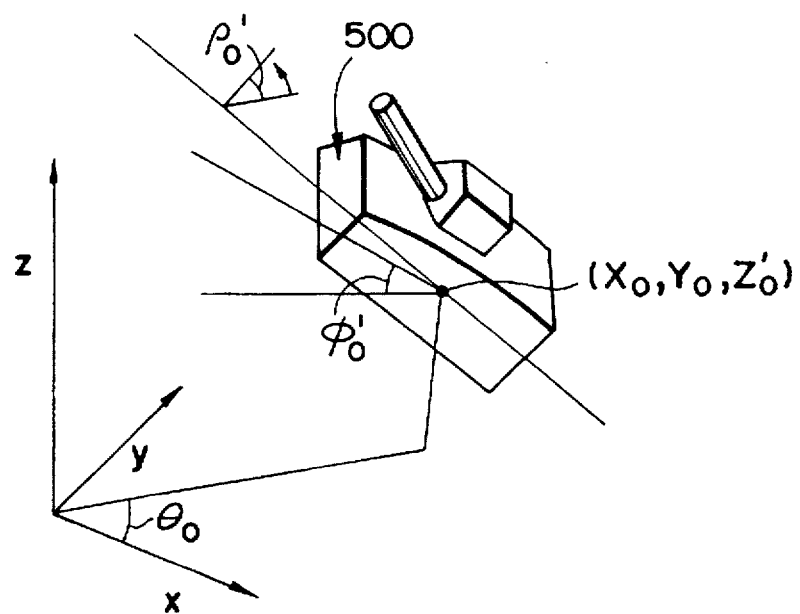

FIG. 3 shows the entire layout of the play field 60. The play field can include various types of 3-D surroundings set by the game program. In FIG. 3, the play field 60 is enclosed by walls 62 over which any fighter cannot escape. The play field 60 further includes a first plateau 64 and a low ground 66 formed by surrounding slopes 68, 70, 72 and 74 centrally in the first plateau 64. Second and third plateaus 76 and 78 are also formed on the low ground 66. The play field 60 further has obstacles 80 and 82.

The future tank 500A controlled by the player 50 confronts another future tank 500B controlled by an enemy fighter on the low ground 66. FIG. 3 shows that the second and third plateaus 76, 78 and the obstacles 80, 82 are located between the future tanks 500A and 500B. Thus, the player 50 cannot view the enemy's future tank 500B on the display 44. The player 50 must first discover the enemy's position 52 through the enemy-tracking radar 520. The player 50 operates his or her steering levers 12 and 14 to control his or her own future tank 500A so that it will move over the second and third plateaus 76, 78, avoid the obstacles 80 and 82 and approach the enemy to attack it.

Figure 4B:
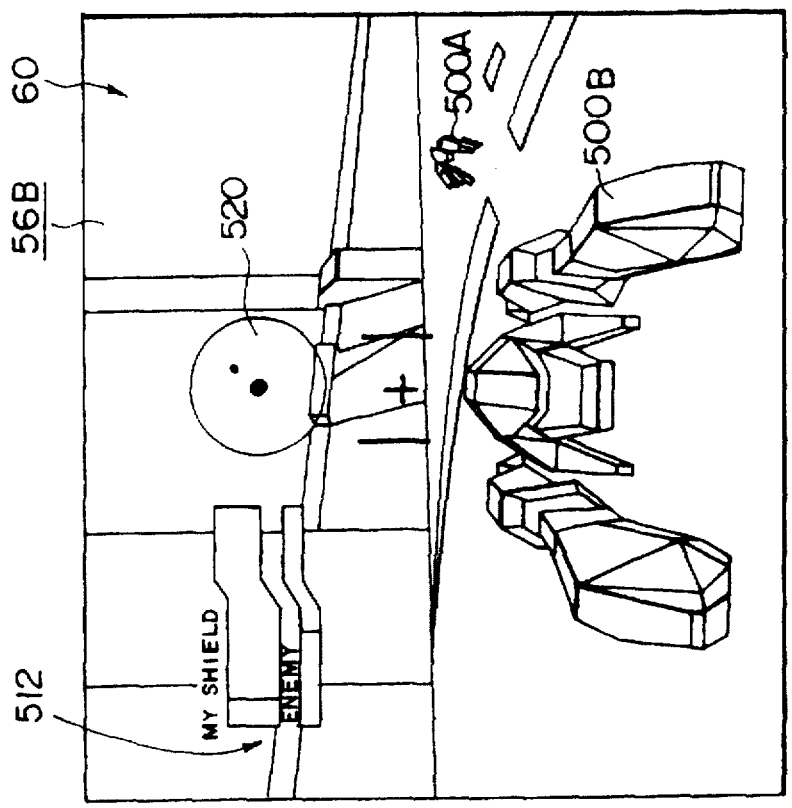
FIGS. 4A and 4B are schematic views showing pseudo 3-D images synthesized by the video game system of the embodiments of the present invention.
Figure 4A:
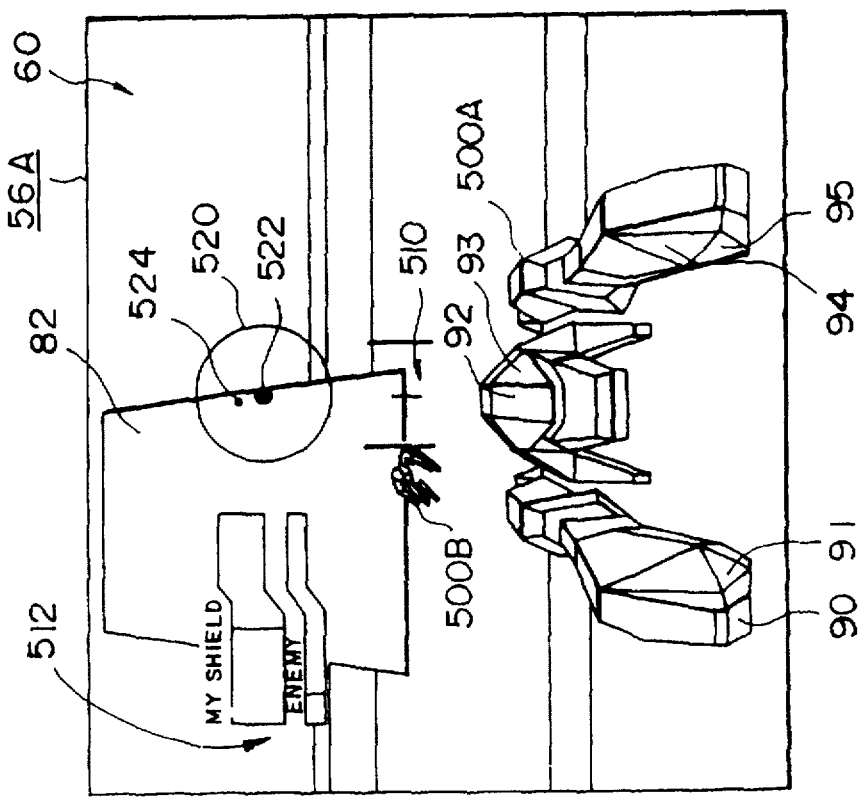

FIG. 4A shows a pseudo 3-D image 56A reflected on the display 44 when the player's future tank 500A approaches the enemy's future tank 500B. The pseudo 3-D image 56A includes a shield indicating portion 512 for indicating the amount of shield in each of the future tanks 500A and 500B. At present, the amount of shield (defense capacity) in the future tank 500A of the player highly exceeds that of the enemy's future tank 500B. This is a chance of attack for the player 50. On the contrary, the enemy's future tank 500B must avoid such a critical conditions and discover an item usable to restore its own amount of shield.

Since the plateaus 66, 76, 78, obstacles 80, 82 and surrounding slopes 68, 70, 72, 74 are formed in the play field 60 in which the future tanks 500A and 500B move around, there may exist a height difference or obstacle between the player's and enemy's future tanks. Therefore, the player 50 must control his or her own future tank 500A utilizing such topographic conditions so that the player 50 can proceed with the game while skillfully attacking the enemy. The interest of the game can be increased if the enemy's future tank 500B can also avoid the critical conditions while skillfully utilizing the topographic conditions.

Figure 5:
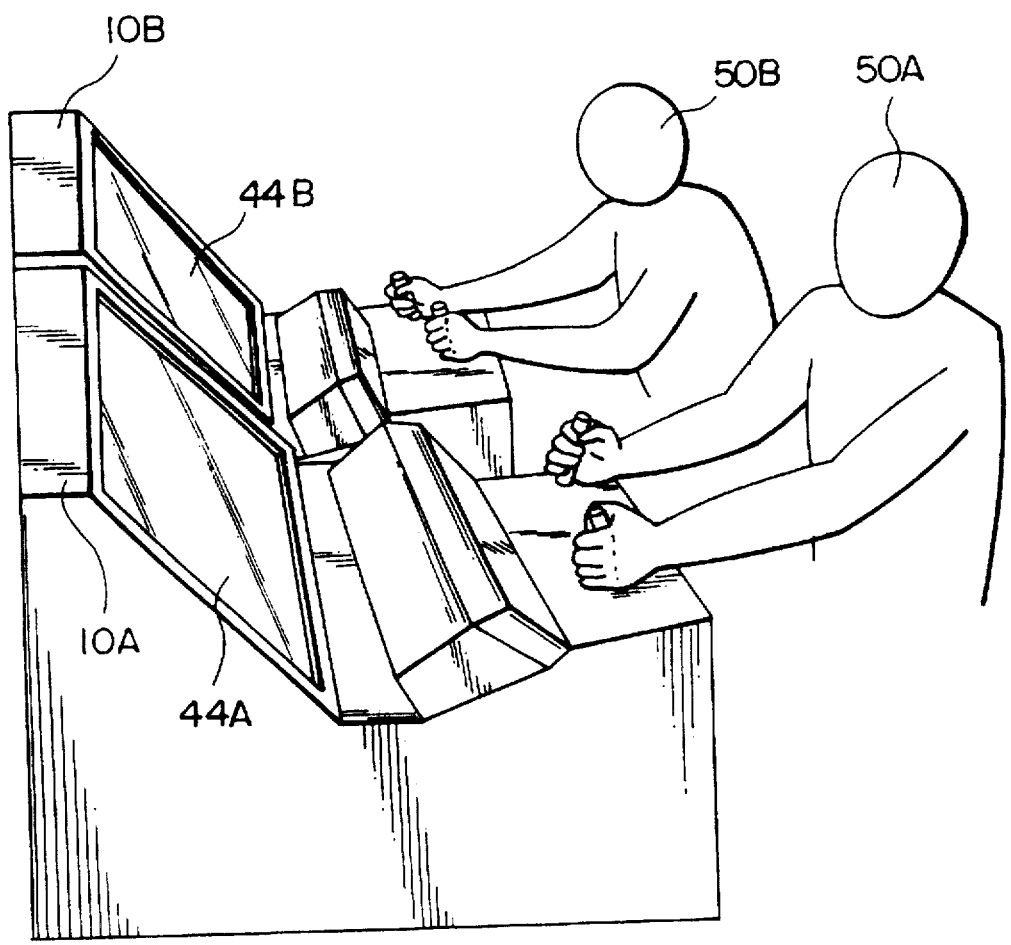
FIG. 5 is a view showing the appearance of the video game system when it is played by two players according to the embodiments of the present invention.

If one player only plays the game as shown in FIG. 2, the enemy's future tank 500B will be controlled by a computer. On the contrary, FIG. 5 shows the appearance of a 3-D game system constructed according to the first embodiment if two players competes with each other in the game. In such a case, one of the players 50A will control a future tank 500A while viewing a display 44A. At the same time, the other player 50B will control a future tank 500B while viewing a display 44B. As shown in FIG. 4A, the display 44A reflects a pseudo 3-D image 56A as viewed from behind the future tank 500A. On the other hand, the display 44B reflects a pseudo 3-D image 56B as viewed from behind the future tank 500B, as shown in FIG. 4B. Thus, the two players will play the game within the same virtual 3-D game space while viewing the different pseudo 3-D images from the different view points. Although FIG. 5 shows only two players, the present invention is not limited to such a two-player game, but may be applied to any one of multi-player game which can be played by three or more players simultaneously.

Details of the Entire System

Figure 1:
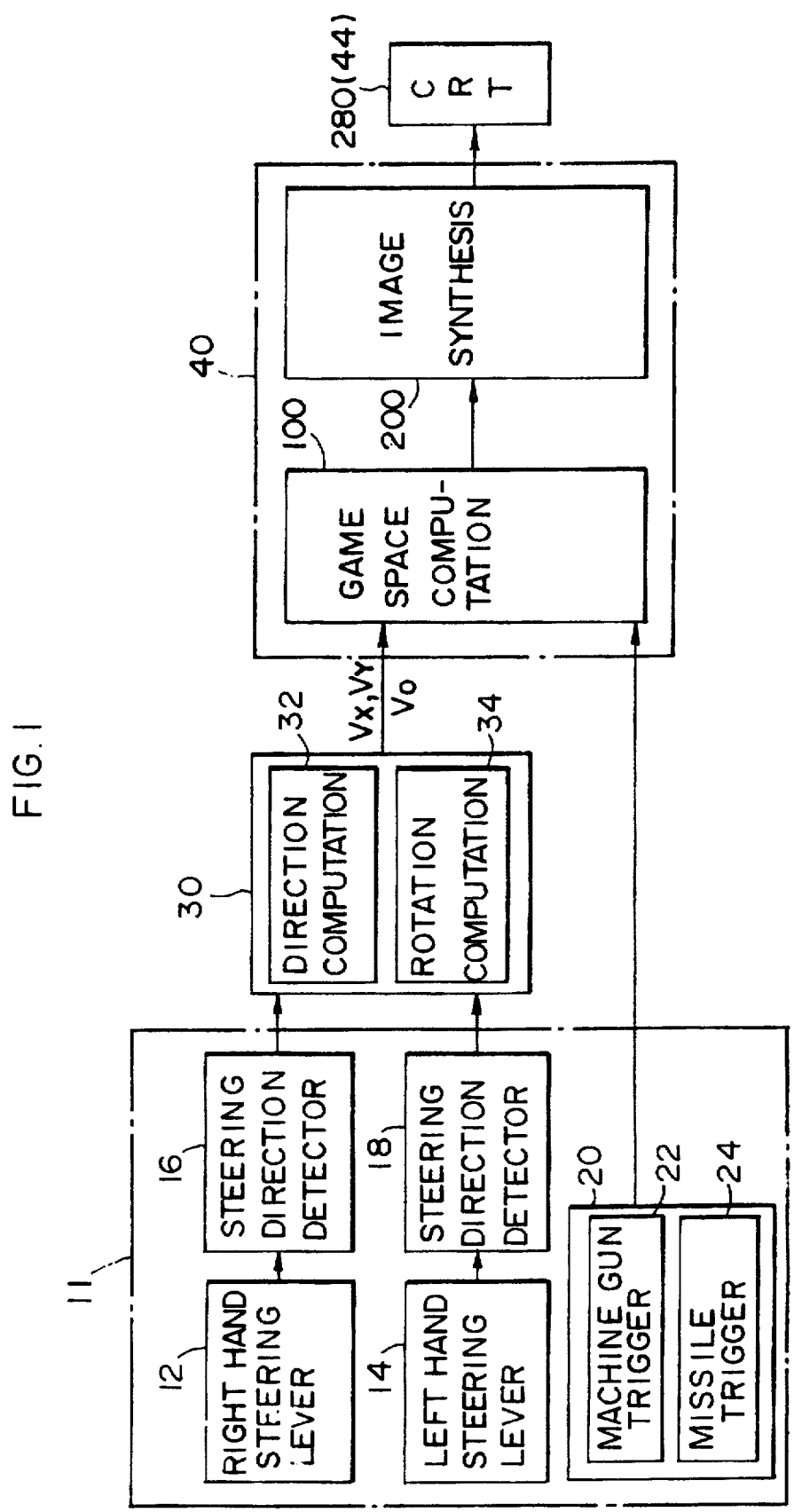
FIG. 1 is a block diagram of preferred embodiments for a video game system constructed in accordance with the present invention.

FIG. 1 shows a block diagram of a 3-D game system which relates to the first embodiment of the present invention.

The 3-D video game system comprises a console 11 to which a player inputs a operating signal, a steering information computing unit 30 for computing the steering information of a movable object controlled by the player, and a game computing unit 40 responsive to steering signals computed by and output from the steering information computing unit 30 for computing the game so that the movable object will move within a given game space and be reflected on the display 44.

Figure 6A:
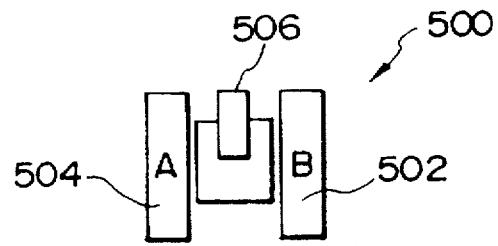
FIGS. 6A, 6B and 6C are diagrams of a movable object appearing on the video game of the embodiments of the present invention.
Figure 6B:
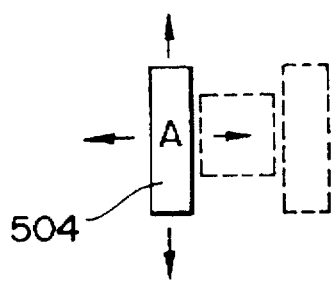

The game computing unit 40 designs a future tank 500 which is the movable object controlled by the player, as shown in FIGS. 6A and 6B. As shown in FIG. 6A, the future tank 500 includes right and left propulsion units 502, 504 which are arranged symmetrically in the lateral direction, and a gun barrel 506 mounted on the future tank between these propulsion units to match the aiming direction of machine gun and missile. Each of the right and left propulsion units 502, 504 is designed such that it can generate a propulsion force corresponding to the angle of the corresponding steering lever 12 or 14 inclined in a direction.

Each of the propulsion units 502, 504 is designed to move at any speed in any direction within a range of 360 degrees. For example, the left propulsion unit 504 may be designed to generate a propulsion force in any direction, forward, backward, lateral or oblique, according to the operation of the left-hand steering lever 14, as shown in FIG. 6B.

When the steering levers 12 and 14 are operated in combination, therefore, the propulsion forces in the propulsion units 502 and 504 can be combined with each other to control the future tank 500 simply in any direction with a free and complicated motion.

1-1: Details of Steering Levers

Figure 7A:
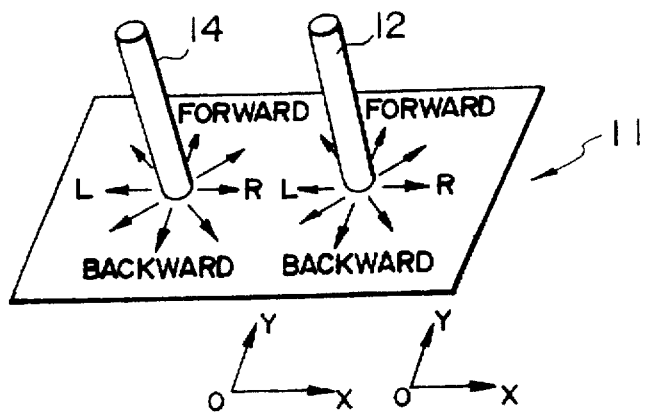
FIGS. 7A and 7B are views illustrating two steering levers used in the video game system of the embodiments of the present invention.
Figure 7B:
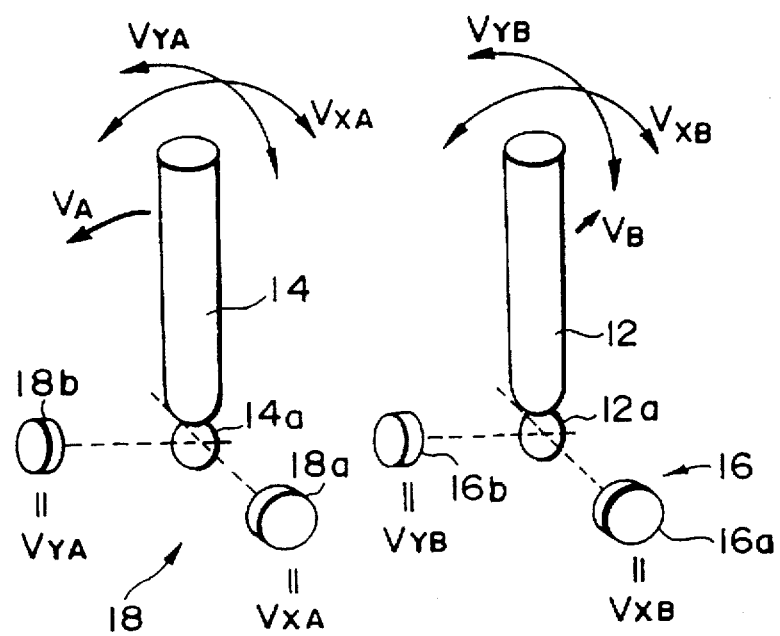

As shown in FIG. 7B, each of the steering levers 12 and 14 includes a lower end support 12a or 14a which is pivotally supported to incline in any direction. Each of the steering levers 12 and 14 is biased to its home position under the action of a spring or the like such that it can be automatically returned to the home position shown by solid line when there is not any external force.

Each of the steering levers 12 and 14 is gripped and inclined in any direction by the player 50 with his or her right or left hand to command a direction in which the corresponding propulsion unit 502 or 504 should indicate. Further, each of the steering levers 12 and 14 can be set at any angle in the direction of operation. Depending on the magnitude of the set angle, the propulsion force (speed) in the corresponding propulsion unit 502 or 504 can be continuously set in an analog manner. More particularly, as the inclined angle is increased or decreased, the speed will be larger or smaller.

For such a purpose, each of the steering levers 12 and 14 includes a steering direction detecting unit 16 or 18 which detects X- or Y-coordinate components in the steering direction and outputs them toward the movable object steering information computing unit 30. It is now assumed that the home position of each of the steering levers 12 and 14 is zero while X- and Y-axes are set in the lateral and longitudinal directions, respectively. Each of the steering direction detecting units 16 and 18 includes an X-direction component detecting volume 16a or 18a and a Y-direction component detecting volume 16b or 18b, which are adapted to detect the X- and Y-coordinate components from the operational direction and inclination in the respective lever. The X- and Y-coordinate components so detected are then output toward the steering information computing unit 30 as information of the first and second propulsion vectors in the respective propulsion units 502 and 504.

The steering information computing unit 30 is responsive to the information of the first and second propulsion vectors thus input for computing information of the directions of propulsion and rotation in the movable object (player's future tank 500) to form a steering signal which is in turn output therefrom toward the game computing unit 40. For such a purpose, the steering information computing unit 30 of this embodiment may include a direction computing unit 32 and a rotation computing unit 34.

The direction computing unit 32 is responsive to the information of the first and second propulsion vectors input thereinto for computing the direction and force of propulsion in the future tank 500 to form direction information of propulsion which includes X- and Y-direction propulsion velocity components $V_{xo}$ and $V_{yo}$ to be output.

Figure 6C:
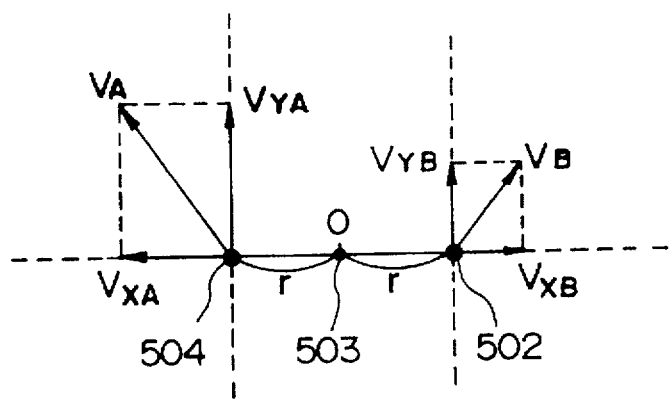

As shown in FIG. 6C, it is now assumed that the central position 503 of each of the propulsion units 502 and 504 in the future tank 500 is in the reference or zero point, the right direction relative to the reference point 503 being positive in the X-coordinates and the forward direction relative to the reference point 503 being positive in the Y-coordinates. The propulsion velocity components in the first and second propulsion vectors $V_B$, $V_A$ acting on the respective propulsion units 502 and 504 are used to compute the propulsion velocities $V_{XO}$ and $V_{YO}$ of the future tank 500 in the X- and Y-directions according to the following equations:

$$V_{XO} = V_{XA} + V_{XB} \quad (1)$$

$$V_{YO} = V_{YA} + V_{YB} \quad (2)$$

The rotation computing unit 34 is responsive to the information of the first and second propulsion vectors input thereinto for computing the rotation angular velocity $V_{\theta 0}$ of the future tank 500 to form and output rotational information.

It is now assumed that the clockwise direction as viewed in FIG. 6C is positive in the direction of rotation. The rotation computing unit 34 computes the rotational information in the future tank 500 according to the following equation (rotation moment formula):

$$V_{\theta 0} = V_{\theta A} + V_{\theta B} = (rV_{YA}) + (-rV_{YB}) = r(V_{YA} - V_{YB}) \quad (3)$$

where r is the absolute value of X-coordinate in each of the propulsion units 502 and 504.

Figure 8A:
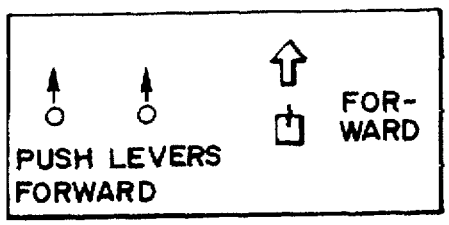
FIGS. 8A–8H are views illustrating some concrete examples of the detailed operation of the movable object controlled by the steering levers shown in FIGS. 7A and 7B.
Figure 8B:
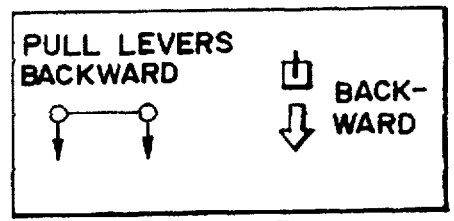
Figure 8C:
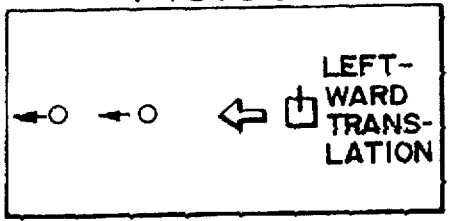
Figure 8D:
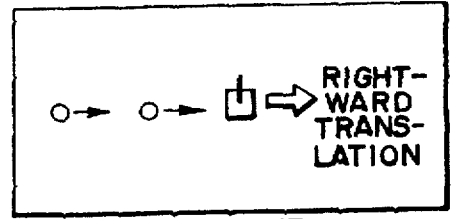
Figure 8E:
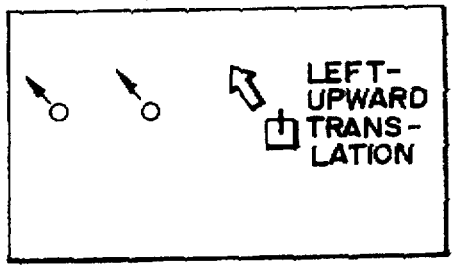
Figure 8F:
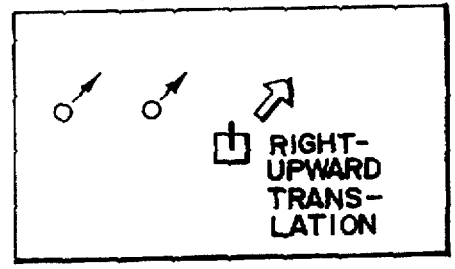
Figure 8G:
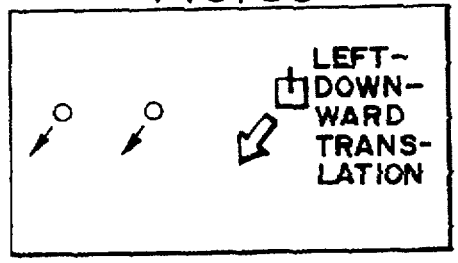
Figure 8H:
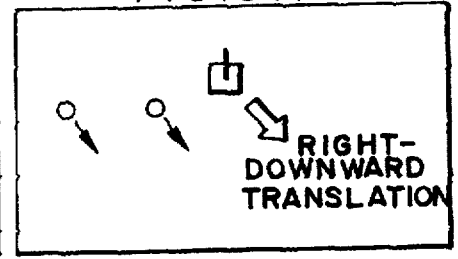

When the right and left steering levers 12, 14 are simultaneously inclined by the same amount in the same direction as shown in FIGS. 8A–8H, the steering information computing unit 30 outputs a steering signal for moving the future tank 500 in the lever inclined direction at a speed corresponding to the movement of the steering levers without change of its posture. If both the steering levers 12 and 14 are inclined in the forward direction as shown in FIG. 8A, the future tank 500 will be moved in the forward direction. If both the steering levers 12 and 14 are inclined in an oblique direction as shown in FIG. 8D or 8F, a steering signal which instructs the future tank 500 to translate in the same oblique direction will be output.

Figure 9A:
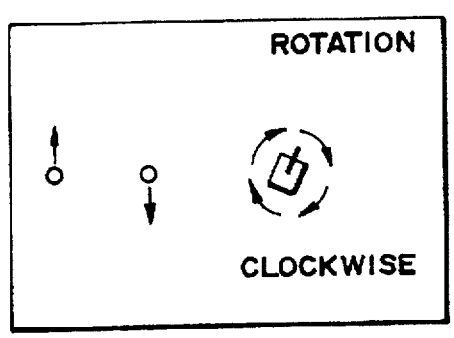
FIGS. 9A–9D are views illustrating the further concrete examples of the detailed operation of the movable object controlled by the steering levers shown in FIGS. 7A and 7B.
Figure 9B:
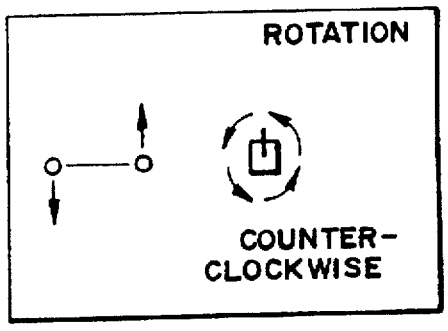

If the right and left steering levers 12, 14 are operated in different directions or by different distances as shown in FIGS. 9A–9D, the steering information computing unit 30 outputs a steering signal for rotating or turning the future tank 500 depending on the operation. If the right and left steering levers 12, 14 are operated by the same distance respectively in the forward and backward directions as shown in FIGS. 9A and 9B, the steering information computing unit 30 outputs an angular velocity signal $V_{\theta 0}$ as a steering signal for rotating the future tank 500 rightward or leftward about its rotational axis. In such a case, the values $V_{XO}$, $V_{YO}$ are set zero since the future tank itself does not change its position.

Figure 9C:
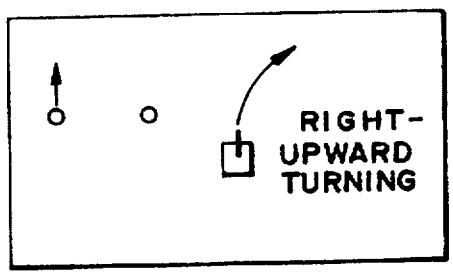
Figure 9D:
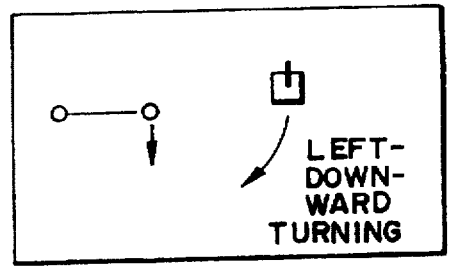

If only one of the steering levers is operated as shown in FIGS. 9C and 9D, the steering information computing unit 30 outputs a steering signal for turning and moving the future tank 500 rightward or leftward along a curved line. If the right and left steering levers 12, 14 are inclined by different distances in the same direction, the steering information computing unit 30 outputs a steering signal for turning and moving the future tank 500 along a curved line corresponding to the difference of distance between the steering levers.

The game computing unit 40 is responsive to a steering signal so input thereinto for computing the game such that the player's future tank 500 moving the play field 60 will be reflected on a display 280.

According to the first embodiment, thus, the right and left steering levers 12, 14 can be operated in combination to control the player's future tank 500 so that it will move forward or backward, turn along a curved line, rotate about its own rotational axis and translate in all the directions.

The specific structure in which the right and left steering levers 12, 14 are provided respectively for the right and left propulsion units 502, 504 in the future tank 500 with the propulsion vectors to the respective propulsion units 502, 504 being independently set provides a tank control feel approximating the human's natural feel to the player so that the game can simply be controlled and enjoyed even by a beginner.

Figure 10:
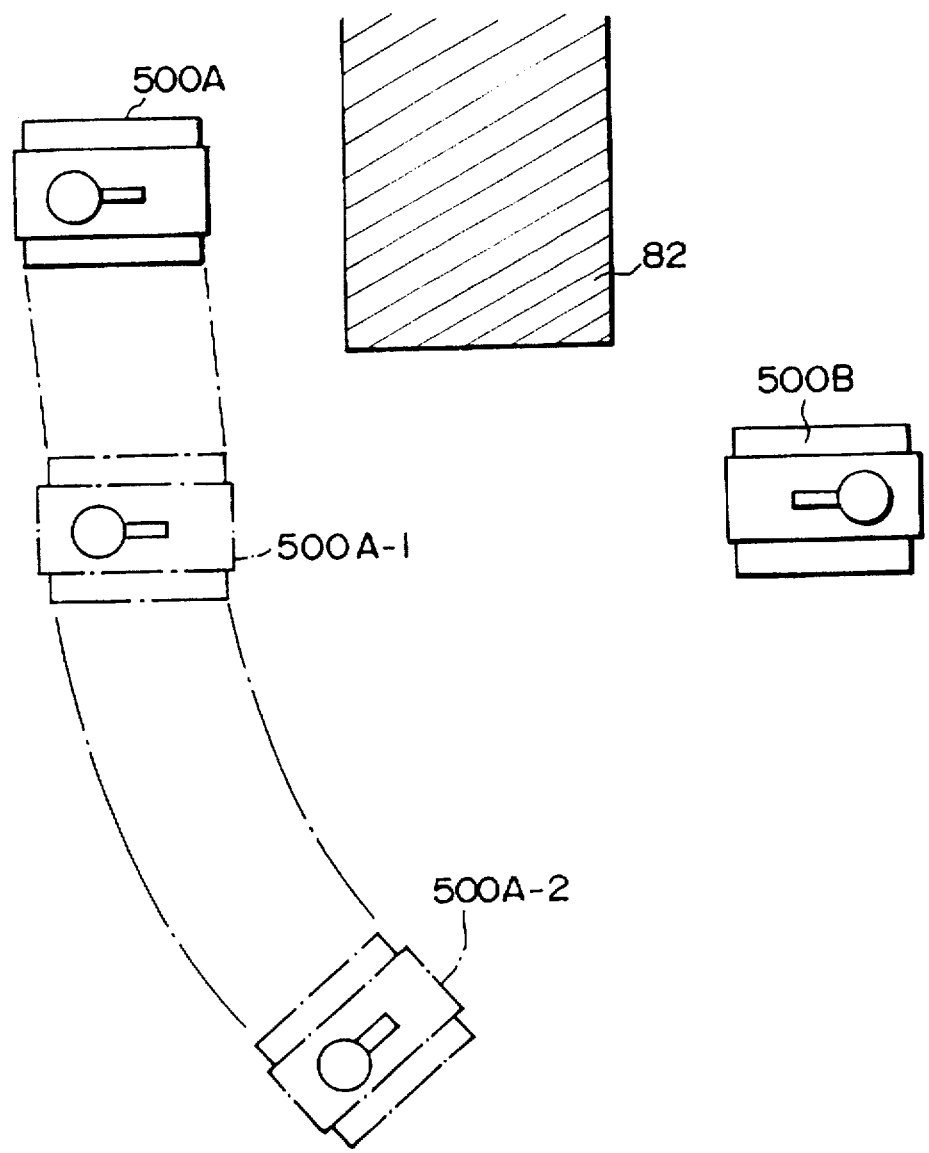
FIG. 10 is a view illustrating a fighting type game done using the video game system of the embodiments of the present invention.
Figure 11:
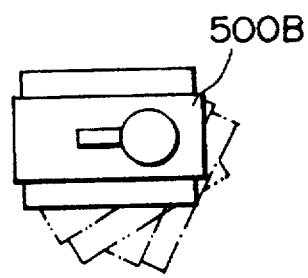
FIG. 11 is a view illustrating the action of one of the tanks in the game of FIG. 10.

The use of such two steering levers 12, 14 enables the future tank to move with a unique motion which would not be provided by the prior art. Even if the enemy's future tank 500B lies in wait behind the obstacle 82 as shown in FIG. 10, the player can take a hit-and-away strategy that he or she operates the trigger buttons 22 and 24 to attack the enemy and to make a quick escape from the war field while sliding his or her future tank 500A in the lateral direction. Further, the player can also translate his or her future tank in an arcuate line while taking aim at the enemy's future tank 500B, as shown by 500A-1 and 500A-2. In such a case, the enemy's future tank 500B may take such a strategy that it rotates about its own rotational axis to aim at and counterattack the escaping player's future tank, as shown in FIG. 11.

In the first embodiment, thus, the future tanks 500A and 500B controlled by the respective players can be moved in various different turning/rotating motions in addition to the forward, backward and translating motions, resulting in provision of a varied and speedy game which is superior in strategy and extremely interesting as a fighting type game.

Although the first embodiment has been described as to the steering levers 12 and 14 which are analog levers for inputting propulsion vectors in all the direction covering 360 degrees, the present invention may be applied to digital levers which can input eight propulsion vectors in longitudinal, transverse and oblique directions. Although the motion of the movable object itself will be limited, it may be considered that the steering levers 12 and 14 is set only to the directions of the first and second propulsion vectors and that the magnitudes of the first and second propulsion vectors are fixed or stepwise input.

1-2: Details of the Game Computing Unit

The details of the game computing unit 40 will now be described below.

The game computing unit 40 comprises a game space computing unit 100 for setting a game space according to a given game program and an image synthesizing unit 200 for forming a pseudo 3-D image in the player's viewpoint. The pseudo 3-D image is reflected on the CRT 280.

Figure 12:
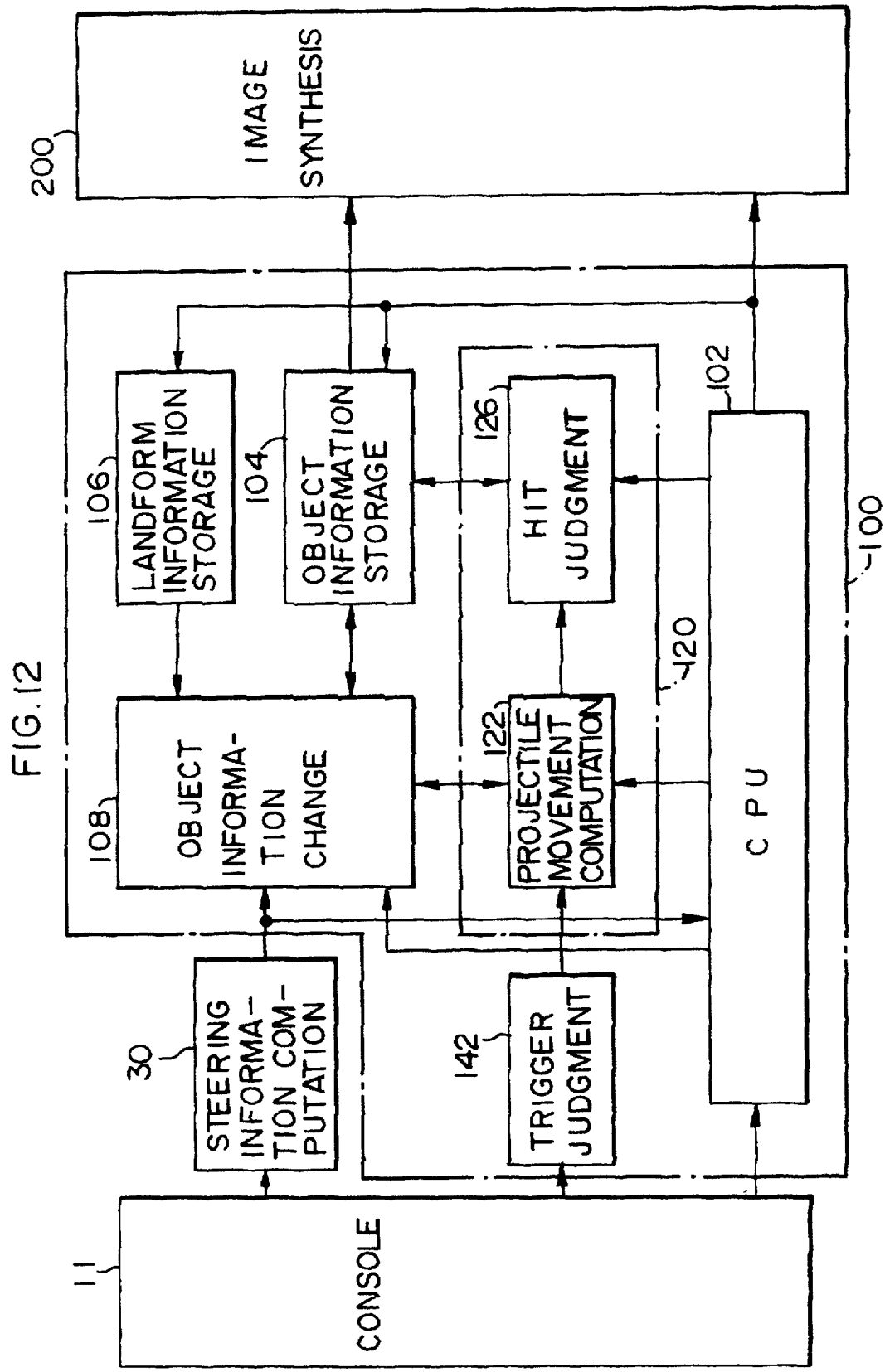
FIG. 12 is a block diagram showing the details of the game space computing unit shown in FIG. 1.

FIG. 12 exemplifies the details of the game space computing unit 100.

The game space computing unit 100 comprises a central processing unit 102, an object information storage unit 104, a landform information storage unit 106, an object information changing unit 108, a trigger judgment unit 142 and a projectile processing unit 120.

The central processing unit 102 includes a memory in which a given game program has been stored and is adapted to control the entire 3-D game system.

The object information storage unit 104 has stored object information which includes the position and direction information of a 3-D object defining a virtual 3-D space.

The landform information storage unit 106 has stored landform information of the play field 60 formed by the 3-D surroundings, for example, as height data.

The object information changing unit 108 is responsive to the landform information stored in the landform information storage unit 106 for changing the object information stored in the object information storage unit 104 at all times.

The trigger judgment unit 142 judges whether or not the player has shot the projectiles. If the player has shot the projectiles, the trigger judgment unit 142 generates a firing signal.

The projectile processing unit 120 comprises a projectile movement computing unit 122 and a hit judgment unit 126. The projectile movement computing unit 122 computes the position of the projectile from the object information of the movable object (player's future tank 500A) changed by the object information changing unit 108 and the firing signal from the trigger judgment unit 142.

The hit judgment unit 126 reads the object information of a target (e.g., enemy's future tank 500B) from the object information storage unit 104 and uses this object information with the position of the projectile computed by the projectile movement computing unit 122 to judge whether or not the projectile hits the target. If the projectile hits the target, that hit judgment information is reflected on the object information of various 3-D objects stored in the object information storage unit 104.

Figure 13:
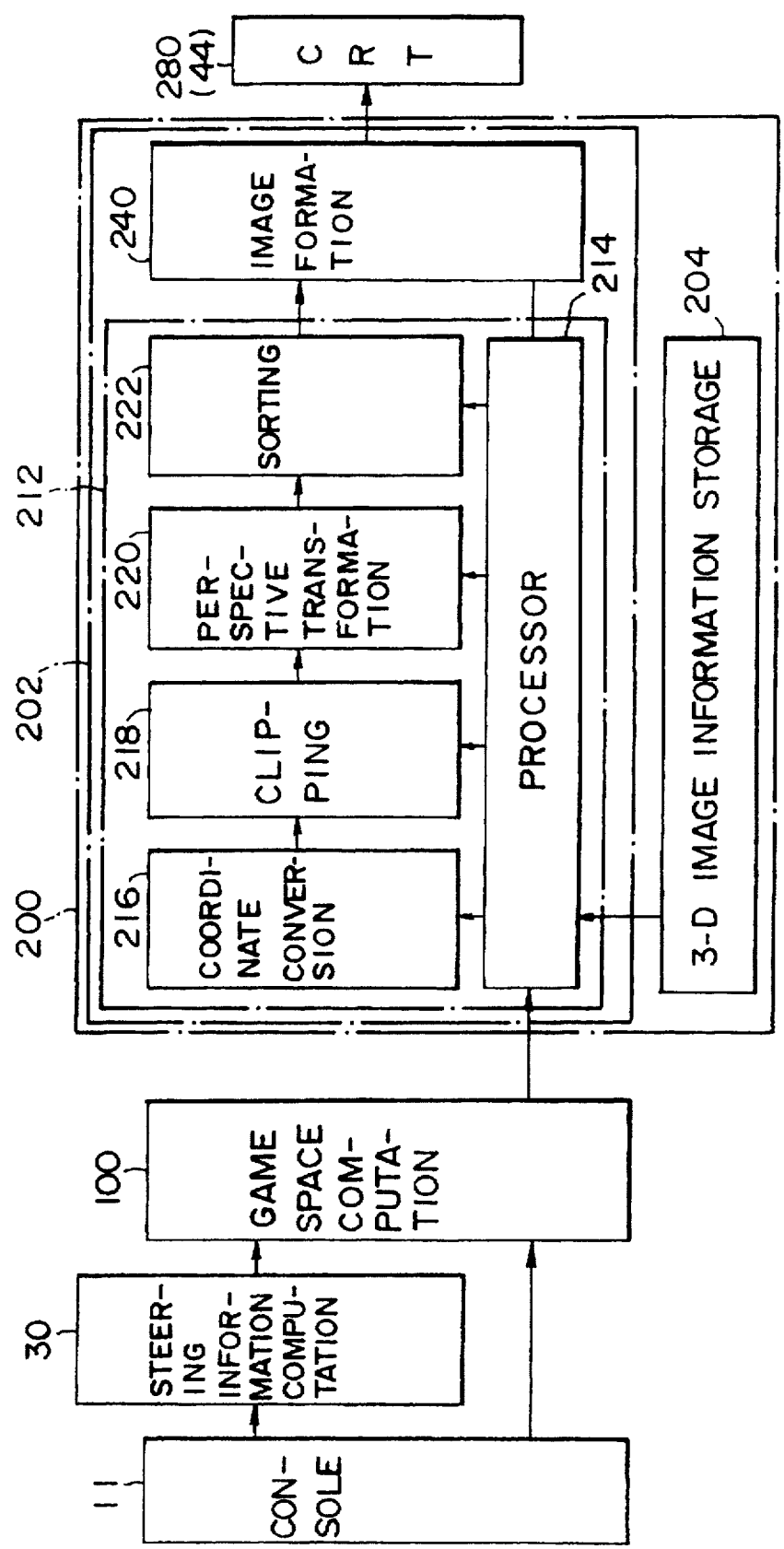
FIG. 13 is a block diagram showing the details of the image synthesizing unit shown in FIG. 1.

FIG. 13 exemplifies the details of the image synthesizing unit 200.

The image synthesizing unit 200 synthesizes a pseudo 3-D image viewed by the player 50 at any viewpoint within the virtual 3-D game space, that is, such a pseudo 3-D image as is reflected on the display 44 in FIG. 2. For such a purpose, the image synthesizing unit 200 comprises a 3-D image information storage unit 204 and an image computing unit 202.

The 3-D image information storage unit 204 has stored the 3-D images of all the 3-D objects. The 3-D objects include movable objects such as future tanks 500A and 500B shown in FIGS. 4A and 4B, surroundings such as walls 62, low ground 66, second and third plateaus 76, 78, obstacles 80, 82 and other objects forming the virtual 3-D game space. As shown in FIGS. 4A and 4B, for example, a 3-D object may be formed by a set of polygons 90–95. Information including the vertex coordinates and others in the polygons has been stored in the 3-D image information storage unit 204 as 3-D image information.

The image computing unit 202 comprises an image supply unit 212 and an image forming unit 240.

The image supply unit 212 comprises a processing unit 214 for controlling the entire image synthesizing unit 200, a coordinate changing unit 216 for processing the 3-D image information including the polygon vertex coordinates and the like, a clipping processing unit 218, a perspective transformation unit 220 and a sorting unit 222.

The image forming unit 240 computes image information of all the dots in the polygons from the image information of the polygon vertex coordinates and the like which has been three-dimensionally processed by the image supply unit 212. The computed image information is output from the image forming unit 240 as a pseudo 3-D image.

The details of the game space computing unit 100 will be described below.

At the same time as the game is started, the central processing unit 102 first causes the object information including the position and direction information of all the 3-D objects arranged in the virtual 3-D space to be stored in the object information storage unit 104 according to the game program. However, the fixed information in the object information may be previously stored in the object information storage unit 104 at its nonvolatile memory location.

The object information stored in the object information storage unit 104 may be stored in such a format as shown in FIG. 14. In FIG. 14, indexes (0–n) are serial numbers for representing the respective 3-D objects. For example, the index 0 may indicate the future tank 500A; 1 the enemy's future tank 500B; 2 the wall 62; and 3 the obstacle 80. Thus, the position and direction information (including the information of inclination) of the future tank 500A in the virtual 3-D space is set at $(X_0, Y_0, Z_0)$ and $(\theta_0, \phi_0, \rho_0)$. $\theta_0$ is the orientation of the future tank 500 indicated by the steering levers 12 and 14; $\phi_O$ and $\rho_O$ are the longitudinal and lateral inclinations of the future tank when it is moving as on the slope. As a result, the position and direction of the future tank 500A will be determined. Similarly, the position and direction information of the enemy's future tank 500, obstacle 80 and other 3-D objects can be determined. In such a manner, the position and direction information of all the 3-D objects defining the virtual 3-d game space will be determined.

A relatively large 3-D object such as future tank 500A or 500B may be divided into parts such as driver seat, left propulsion unit, right propulsion unit, gun barrel and others. It may be considered that one of the aforementioned indexes is assigned to each of these parts which is a 3-D object. Thus, these parts, that is, left propulsion unit, right propulsion unit and gun barrel can independently be operated to draw a future tank 500 which can behave with an improved reality.

The landform information storage unit 106 has stored the landform information of the play field 60 shown in FIG. 3, for example, as height information. The object information changing unit 108 reads and uses the landform information to change the position and direction information of the 3-D objects stored in the object information storage unit 104. Further, the object information changing unit 108 responds to an input steering signal to change the position and direction information $(X_0, Y_0, Z_0, \theta_0, \phi_0, \rho_0)$ of the future tank 500 so that the position, orientation and inclination thereof will be changed. Thus, the system can form a game space reflecting the landform information.

The details of the image synthesizing unit 200 will be described below.

First of all, the processing unit 214 reads out the position and direction information of the 3-D objects from the object information storage unit 104 by using said indexes as addresses. Similarly, the processing unit 214 reads out the 3-D image information of the 3-D objects from the 3-D image information storage unit 204 by using said indexes as addresses. If the index is zero, for example, the position and direction information $(X_0, Y_0, Z_0, \theta_0, \phi_0, \rho_0)$ of the future tank 500 is read out from the object information storage unit 104 while the 3-D image information representing the future tank 500 as a set of polygons is read out from the 3-D image information storage unit 204.

Figure 15A:
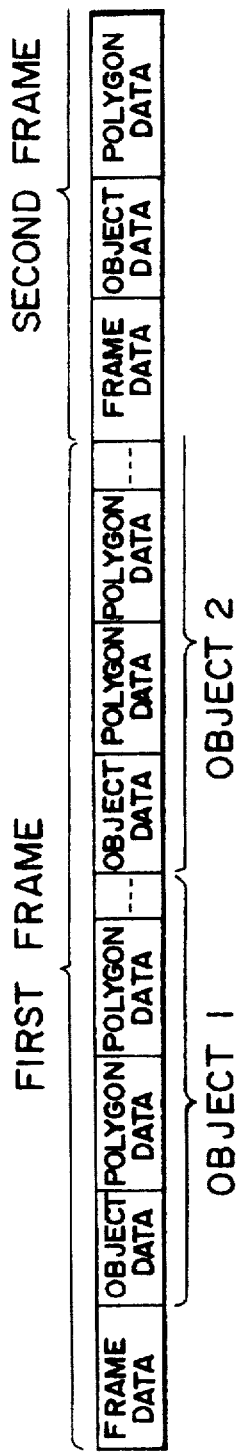
FIGS. 15A and 15B are diagrams showing data formats handled in the 3-D video game system of the embodiments of the present invention.
Figure 15B:
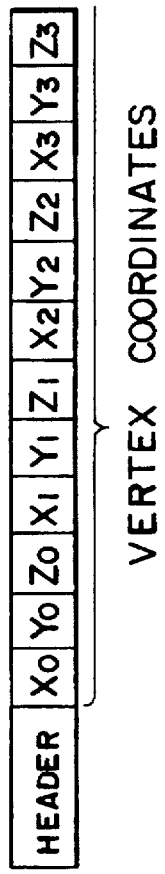

Thus, the processing unit 214 sequentially reads out the indexes which are in turn converted into such a data format as shown in FIGS. 15A and 15B.

FIG. 15A shows the entirety of this data format. As shown in FIG. 15A, the data format includes a plurality of frames, each of which includes a frame data at the head and an adjacent object data of all the 3-D objects represented in this frame. Each of the object data is followed by polygon data of polygons which define the corresponding 3-D object.

The frame data is formed by variable parameters for every frame and defined by common data to all the 3-D objects within one frame, such as player's viewpoint, view angle and angle of visibility information, monitor's angle and magnitude information, light source information and other information. These data are set for every frame. For example, if a plurality of windows are formed in a display, different frame data are set for every window. Thus, the displayed scene may include a view from a rear-vision mirror, a view from above the future tank 500 and the like.

The object data is formed by variable parameters for every 3-D object and defined by data of the positional, directional and other information for every 3-D object. This has substantially the same contents as those of the object information aforementioned.

The polygon data is formed by the image and other information of the polygons and defined by the data such as header, vertex coordinates $X_0, Y_0, Z_0-X_3, Y_3, Z_3$ and other attached data, as shown in FIG. 15B.

The coordinate changing unit 216 reads out the above format data and then performs various processings for the vertex coordinates and the like.

Such processings will be described with reference to FIG. 16.

For example, in a future tank war type game, 3-D objects 300, 332 and 334 representing a player's future tank, an enemy's future tank, a building, an obstacle and others are arranged on a virtual 3-D space which is represented by a world coordinate system $(X_W, Y_W, Z_W)$. The image information representing these 3-D objects is then converted into a viewpoint coordinate system $(X_V, Y_V, Z_V)$ in which the viewpoint of a player 302 is an origin.

The clipping processing unit 218 then performs an image processing known as a so-called clipping processing. The clipping processing can remove image information out of the visual field of the player 302 (or out of a window opened on the 3-D space), that is, image information out of an area enclosed by forward, backward, rightward, leftward, downward and upward clipping faces 340, 342, 344, 348, 346 and 350 (which will be referred to "display area 2"). In other words, image information which is necessary for subsequent processing by the system of the present invention is only within the visual field of the player 302. If the information other than the necessary information has been removed through the clipping processing in such a manner, the subsequent processing can have a greatly reduced load.

The perspective transformation unit 220 then perspectively projects and transforms only the objects within the display area 2 onto a screen coordinate system $(X_S, Y_S)$. The resulting data is output toward the sorting unit 222.

The sorting unit 22 determines a sequence of processing in the subsequent image forming unit 240. According to the determined sequence, polygon image data will be output.

The image forming unit 240 computes the image information of all the dots in the polygons from the vertex coordinate and other data which have been three-dimensionally processed by the image supply unit 212. Such a computing technique may be replaced by such a technique that determines the outline of a polygon from the vertex coordinates thereof, then determines outline point pairs which are intersection points between the determined outline and scan lines and causing lines formed by the outline point pairs to interrelate with given color data and the like. A technique may be used that causes the image information of all the dots in the polygons to have been stored in ROM or the like as texture information, reads out the image information by the use of texture coordinates provided to the respective polygon vertices as addresses and performs mapping.

Finally, the pseudo 3-D image formed by the image forming unit 340 is displayed on the display 44.

1-3: Computing Technique Causing Landform Information to Object Information of Movable Object A computing technique causing the landform information to the object information of a movable object will be described.

As shown in FIG. 12, the object information changing unit 108 reads out the landform information from the landform information storage unit 106, which is in turn used to change the 3-D object information stored in the object information storage unit 104.

The landform information storage unit 106 has stored the landform information of 3-D topography (e.g., height information). The landform information storage area in the landform information storage unit 106 is such a hierarchical structure as shown in FIGS. 27A, 27B and 27C. The hierarchical structure includes a top play field area shown in FIG. 27A, an inter-area block area located below the top play field area as shown in FIG. 27B and a topographic block area located below the inter-area block area as shown in FIG. 27C. The provision of the hierarchical structure for the landform information storage area is because the data can be compressed to provide a number of game spaces to which more delicate change of the topography is reflected.

The play field area selects one of a plurality of play fields which have been provided in this 3-D game. It is now assumed that the play field area selects such a play field shown in FIG. 3, as shown in FIG. 27A.

This play field 60 is divided into four by four inter-area blocks (17–32), as shown in FIG. 28A. Such a division of one play field into a plurality of inter-area blocks, that is, a combination of 32 inter-area blocks facilitates the formation of much many types of play fields. For example, only by slightly changing the sequence of inter-area blocks (pb17–32) shown in FIG. 28A, another play field fully different from the play field 60 of FIG. 3 can be simply formed.

Figure 28B:
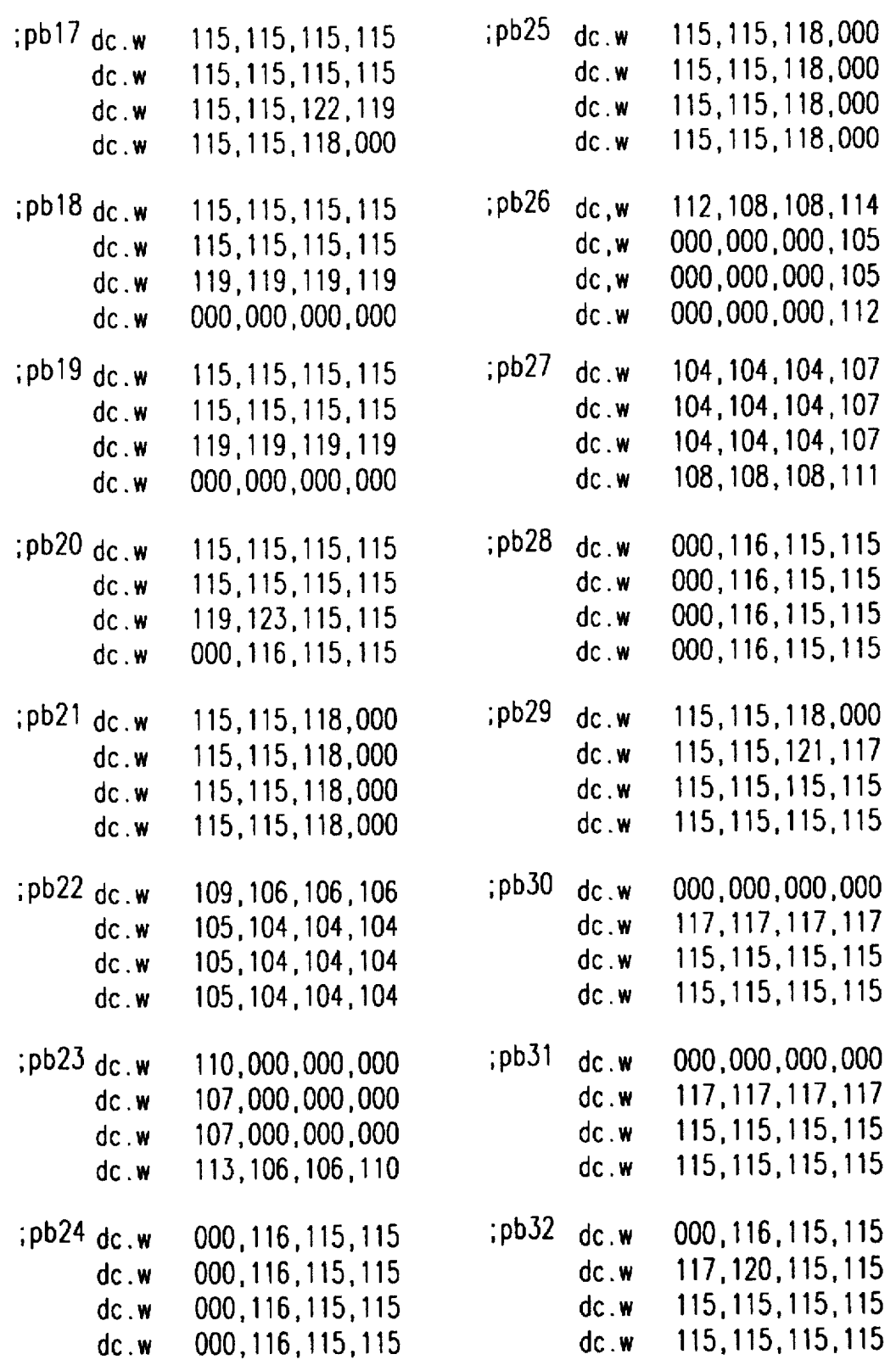

As shown in FIG. 28B, each of the inter-area blocks may be further divided into topographic blocks equal to 4×4=16. For example, an inter-area block pb17 may be divided into 16 topographic blocks pile 000, 115, 118, 119 and 122. This enables the data to be further compressed.

Figure 29:
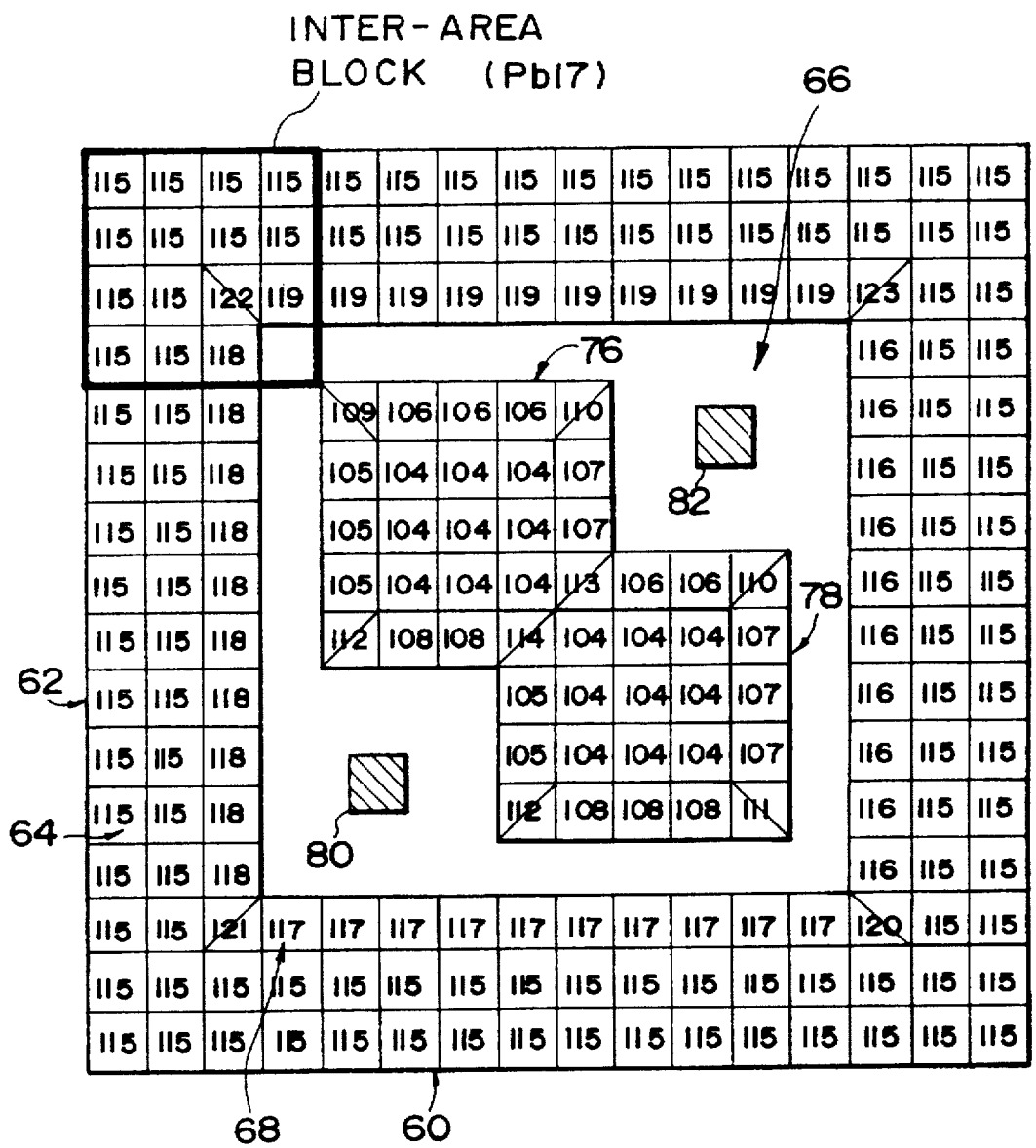
FIG. 29 is a conceptual diagram illustrating a topographic block array in the game field.

The topographic blocks are blocks in which the topographic height information is stored. FIG. 29 diagrammatically shows such a play field 60 as formed by these topographic blocks. FIG. 29 corresponds to FIG. 3. FIG. 30 shows the distribution of height information in the respective topographic blocks and more particularly the distribution of height information in the topographic blocks pile 115–123.

As shown in FIG. 29, the walls 62 do not include any topographic block since the future tanks cannot enter there. The first plateau 64 of FIG. 3 is fully represented by a combination of topographic blocks pile 115. In the topographic blocks pile 115, all the height information are set 160, as shown in FIG. 30. This means that the first plateau 64 has a flat top.

As shown in FIG. 29, the slope 68 of FIG. 3 is represented by a combination of topographic blocks pile 118, 121 and 122. The topographic block pile 118 has height information set such that it is highest at the left side (150) and reduces its height toward the rightward direction (000), as shown in FIG. 30. Thus, the slope 68 will be represented. Similarly, the topographic block pile 121 has height information set such that it has a valley toward one corner.

The play field 60 has a zero zone 66 in which no topographic block is disposed. Since the zero zone 66 is a flat place having zero height, the object information of the future tanks are not required to be changed. It is desirable that the zero zone 66 is a place in which the future tanks are located for the longest time period during the game. When the future tanks are in such a place, therefore, the object information changing unit 108 can compute and change the object information through a shortened time period and save the amount of data to be processed.

The obstacles 80 and 82 are set so that they can be broken by missiles launched from the future tanks. After an obstacle has been broken, a topographic block corresponding to the position in which that obstacle has existed will be set therein.

The object information changing unit 108 changes the object information in the following manner.

The object information storage unit 104 first refers to the index of the future tank 500A, for example, index 0 and reads out the object information $(X_0, Y_0, Z_0, \theta_0, \phi_0, \rho_0)$.

As shown in FIG. 31A, the future tank 500A includes virtual landform information sensors 360, 362, 364 and 366 which have been located on the bottom thereof at four points A, B, C and D. The object information changing unit 108 first determines the position information A $(X_{a0}, Y_{a0}, Z_{a0})$, B $(X_{b0}, Y_{b0}, Z_{b0})$, C $(X_{c0}, Y_{c0}, Z_{c0})$ and D $(X_{d0}, Y_{d0}, Z_{d0})$ at these four points from the read object information $(X_0, Y_0, Z_0)$ of the future tank 500A.

The object information changing unit 108 then reads out the landform information at the points A, B, C and D, for example, height information from the landform information storage unit 106 by the use of the determined position information at the points A, B, C and D as read-out addresses.

The read-out address in the landform information storage unit 106 may be two-dimensional position information rather than three-dimensional position information. For example, a read-out address for determining the landform information at the point A may be sufficient to be two-dimensional position information $(X_{a0}, Y_{a0})$. However, if a bridge exists on the play field, the height information will vary depending on whether the future tank 500A is on or under the bridge. In such a case, therefore, the future tank 500A is required to have information for indicating the future tank 500A on or under the bridge, that is, Z-coordinate.

The object information changing unit 108 changes the position information of the points A, B, C and D based on the read height information $(dZ_{a0}, dZ_{b0}, dZ_{c0}, dZ_{d0})$, as follows:

$A(X_{a0}, Y_{a0}, Z_{a0}) \rightarrow A'(X_{a0}, Y_{a0}, Z_{a0}+dZ_{a0})$, $B(X_{b0}, Y_{b0}, Z_{b0}) \rightarrow B'(X_{b0}, Y_{b0}, Z_{b0}+dZ_{b0})$, $C(X_{c0}, Y_{c0}, Z_{c0}) \rightarrow C'(X_{c0}, Y_{c0}, Z_{c0}+dZ_{c0})$, and $D(X_{d0}, Y_{d0}, Z_{d0}) \rightarrow D'(X_{d0}, Y_{d0}, Z_{d0}+dZ_{d0})$, As shown in FIG. 31B, the changed points A', B', C' and D' are used to change the object information $(Z_0, \phi_0, \rho_0)$ of the future tank 500A as follows:

$(X_0, Y_0, Z_0, \theta_0, \phi_0, \rho_0)$ $\rightarrow (X_0, Y_0, Z_0, \theta_0, \phi_0, \rho_0)$ In such a manner, the object information of the future tank 500A in the object information storage unit 104 will be changed.

If necessary, the enemy's future tank 500B, which is another movable object, may be changed in object information.

Figure 32:
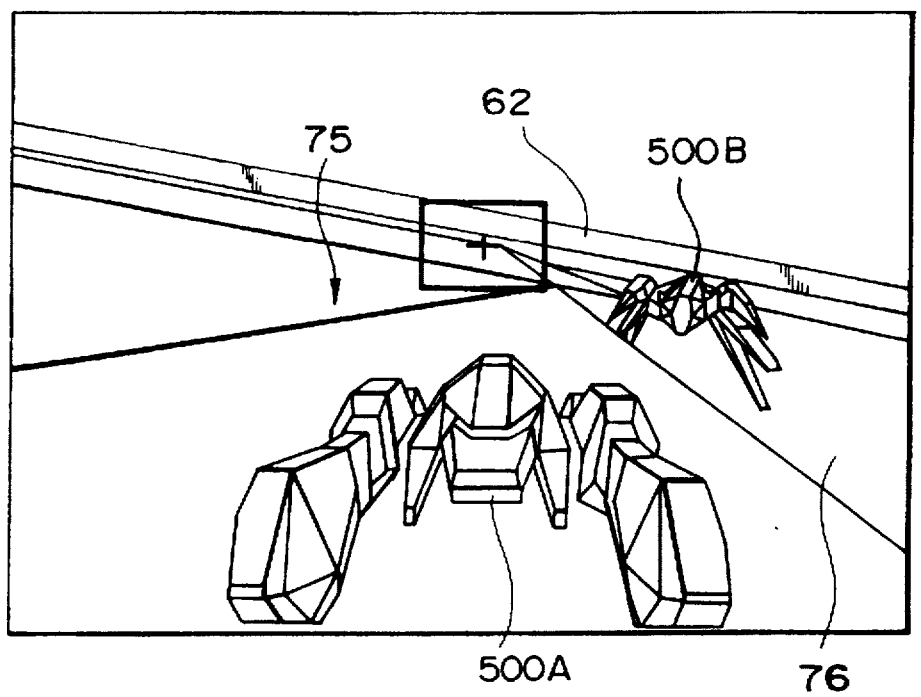
FIG. 32 is a schematic view of a pseudo 3-D image reflecting the landform information.

FIG. 32 shows a pseudo 3-D image when the object information is changed based on the landform information. As shown in FIG. 32, the player's future tank 500A is on a slope 75. Thus, the 3-D game system is reflected by the landform information and synthesizes such a pseudo 3-D image that is viewed as if entirely inclined. This appears from the image of the wall 62. The enemy's future tank 500B is observed upwardly by the player since the former is on the second plateau 76. This means that the landform information be reflected on the 3-D game.

Although the present embodiment has been described as to the synthesization of the inclined pseudo 3-D image by reflecting the landform information onto the 3-D game, the present invention is not limited to such a pseudo 3-D image, but may be applied to a 3-D game on which the landform information is reflected in various patterns as follows:

For example, the landform information of smooth configuration and rough configuration (e.g., gravel road) are provided. More particularly, the height information in the topographic blocks is more finely set to represent the rough road landform information. On the contrary, the smooth road landform information is represented by the topographic blocks having the same height information. If it is now assumed that the future tank 500A moves on a rough road, the pseudo 3-D image will be finely vibrated. If the future tank 500A moves on a smooth road, the pseudo 3-D image will not be vibrated. Thus, the player can imaginarily experience his or her movement on the rough or smooth road.

The landform information reflected on the 3-D game is not limited to the aforementioned landform information. The landform information may be provided for marshland, desert and other landform. When the future tank 500A enters such marshland or desert, the speed of the future tank 500A may be variable depending on the respective landform. Such a setting will be performed more particularly as follows:

As described, the future tank 500A is controlled by the steering signal from the analog levers 12 and 14 which are connected to the console 140. It is now assumed that the player 302 inclines the analog levers 12 and 14 in the forward direction to move the future tank 500A forwardly. Depending on the amount of operation, the object information stored in the object information storage unit 104 is changed in one frame, that is, 1/60 seconds (which will be referred to "T seconds") as follows:

$(X_0, Y_0) \rightarrow (X_0+V_{X0} \cdot T, Y_0+V_{Y0} \cdot T)$.

The Z-coordinate and direction information $\theta$, $\phi$, and $\rho$ are not considered herein for simplicity.

The object information changing unit 108 thus adds negative values to the changed object information depending on the landform information as follows:

$(X_0+V_{X0} \cdot T, Y_0+V_{Y0} \cdot T) \cdot (X_0+V_{X0} \cdot T-dX_0, Y_0+V_{Y0} \cdot T-dY_0)$ The added negative values $-dX_0$ and $-dY_0$ have been stored in the landform information storage unit 106 and are read out therefrom using the position information of the future tank 500A as addresses. The added negative values $-dX_0$ and $-dY_0$ are set to be variable depending on the landform at that position, for example, marshland, desert or the other landform. If an icy road is set, a positive value may be added to accelerate the future tank when it enter the icy road. The interest of the 3-D game can be greatly increased by reflecting the landform information or speed information onto the 3-D game.

When the speed information is combined with the virtual landform information sensors 362–366, the interest of the game can be further increased. For example, the play field 60 may include topographic blocks different in speed information. Since the different speed information is thus set in the movable object at the four landform information sensor 362–366, the movable object may be spinned, for example. Thus, the player can enjoy a pseudo 3-D image which is viewed from the spinning movable object. As a result, the present invention can provide any other game, for example, an on-ice driving game in which a player controls a motorcar while spinning his or her motorcar and viewing a pseudo 3-D image observed by the player from the spinning motorcar.

Although this embodiment has been described as to four virtual landform information sensors on the movable object at four locations, the present invention is not limited to such an arrangement, but may be applied to a case where at least two virtual landform information sensors are located in the movable object. If only the inclination in one direction $\phi$ or $\rho$ should be reflected by the landform information, at least two landform information sensors are sufficient. If the inclinations in two directions $\phi$ and $\rho$ should be reflected by the landform information, at least three landform information sensors are only required. If the movable object is relatively large, however, it is desirable to increase the number of landform information sensors to be mounted depending on the size of the movable object.

As described, the present embodiment can increase the interest of the game by reflecting the landform information such as rough road onto the synthesized pseudo 3-D image. In addition, if the 3-D game represented by the 3-D game system is a fighting game such as future tank war type game, the interest of the game may be increased by reflecting the landform information onto the pseudo 3-D image viewed by the player as well as onto the position of the projectile launched from the movable object or the judgment of hitting. The projectile termed herein includes any projectile launched from all the types of weapons such as laser ray guns, axes, bow guns and others in addition to the machine gun bullets and missile which are used in the present 3-D game.

The interest of the game can be increased by reflecting the landform information onto the position of the projectile or the judgment of hitting. When the player's future tank 500A is to aim at the enemy's future tank 500B, a more complicated sighting operation is required since the irregularity on the landform must be considered. On the contrary, the irregularity on the landform can be utilized as obstacles when the player's future tank is being attacked by the enemy's future tank. If the movable object is inclined on the irregular landform, a complicated "dead angle" may be created by utilizing the up and down movement of the player's visual axis or the irregular landform itself. The fighting game can be improved in interest up to such a degree that would not be attained by the prior art by utilizing the irregular landform for "attacking", "avoiding" and "dead angle". Such a situation is shown in FIG. 33.

Where the player's future tank 500A is to attack the enemy's future tank 500B, the game may be as follows:

At a location I in FIG. 33, projectiles will not hit the enemy since the player's future tank moves upwardly on an upward slope with the gun barrel thereof being oriented in the upward direction. At a location II, the player's future tank opposes to the enemy's future tank since the player's future tank is on a flat plateau top having the same height as the plateau on which enemy's future tank is on. In a location III, the projectiles will not also hit the enemy since the gun barrel of the player's future tank moving on a downward slope is inclined downwardly. In a location IV, the player's future tank can just oppose to the enemy's future tank if the player's future tank is positioned on the end of the upward slope at a specific point. In a location V, the player's future tank cannot catch the enemy's future tank since there is a difference in height between the enemy's future tank and the player's future tank when the latter is on the top of the upward slope.

In order to avoid the attack of the enemy's future tank, the player's future tank may move to any location other than the location II, because the player's future tank will not be hit by the enemy's projectile in any position except the location II. The reflection of the landform information onto the position of the projectile and the judgment of hitting can increase the interest of the 3-D game which would not be accomplished by the two-dimensional games of the prior art.

1-4: Operation

The operation of the 3-D game system according to the present embodiment will be described.

As the game is started in the 3-D game system of the present embodiment, such a scene as shown in FIG. 4A is displayed on the display 44 thereof.

The player 50 operates the steering levers 22 and 24 so that the player's future tank 500A avoids the enemy's attack and defeats the enemy's future tank 500A.

The player 50 operates the steering levers 22 and 24 in combination so that the steering information computing unit 30 computes the information of rotation from the information of advancing direction in the player's future tank 500A and outputs a steering signal ($V_{xo}$, $V_{yo}$, $V_{\theta o}$) toward the game space computing unit 100.

In the game space computing unit 100, the object information changing unit 108 reads the landform information out of the landform information storage unit 106 and uses the read landform information to change the 3-D object information stored in the object information storage unit 104. The object information changing unit 108 is responsive to the steering signal from the steering information computing unit 30 to change the object information as follows:

First of all, the index of the future tank 500A (e.g., index 0) is referred to by the object information storage unit 104 to read out the object information ($X_0$, $Y_0$, $Z_0$, $\theta_0$, $\phi_0$, $\rho_0$).

The read object information of the future tank 500A is rewritten based on the input steering signal and written into the object information storage unit 104.

The rewriting of the object information in the object information storage unit 104 is performed for every frame or 1/60 seconds as follows:

$$(X_0, Y_0) \rightarrow (X_0+V_{xo}\cdot(1/60), Y_0+V_{yo}\cdot(1/60))(\theta_0) \rightarrow (\theta_0+V_{74\,0}\cdot(1/60)).$$

For simplicity, Z-coordinate and inclination information $\phi_0$, $\rho_0$ will not be considered herein.

For every display frame, the object information (e.g., the object information of the future tank 500A) stored in the object information storage unit 104 is thus rewritten to display such a game scene on the display 44 that the future tank 500A moves within the play field 60 under the control of the player 50. When the player's future tank 500A is moved to aim at the enemy's future tank 500B by the use of a sight 510 shown on the display 44 and if the trigger buttons 22 and 24 are actuated, the resulting actuation signal is input into the trigger judgment unit 142 shown in FIG. 12. The sight is displayed in front of the movable game object.

If the trigger judgment unit 142 judges that the machine gun or missile is fired, a firing signal for machine gun or missile is formed and output toward the projectile movement computing unit 122 in the projectile processing unit 120.

The projectile movement computing unit 122 responds to the firing signal to read the object information ($X_0$, $Y_0$, $Z_0$, $\theta_0$, $\phi_0$, $\rho_0$) of the movable object at a moment at which the firing signal is input thereinto from the object information storage unit 104.

The projectile movement computing unit 122 then computes the trajectory of a projectile when the firing position is ($X_0$, $Y_0$, $Z_0$), the firing direction is ($\theta_0$, $\phi_0$, $\rho_0$) and the firing time is a time at which the firing signal is input thereinto. The computation of the trajectory is executed according to an operational expression which has already been set in the projectile movement computing unit 122. For example, if it is assumed that a game of fighting with future tanks in the space is played without consideration of the gravity, the trajectory will have a linear direction ($\theta_0$, $\phi_0$, $\rho_0$). On the contrary, if it is assumed that a game of fighting with future tanks on the earth or other planets is played with consideration of the gravity, the trajetory will be parabolic. In the latter case, the future tank 500A can hit the enemy's future tank 500B even if the gun barrel of the future tank 500A is not completely oriented to the enemy's future tank 500B. More particularly, the player's future tank 500A can attack the enemy's future tank 500B with its long-range cannon for launching a projectile in a parabolic trajectory even if the player's future tank 500A cannot view the enemy's future tank 500B behind the first and second plateaus 76, 78 therebetween, as shown in FIG. 3. Thus, the game can be more increased in interest since the player can attack the enemy located in a dead angle behind any 3-D landform.

In the future tank fighting game, the object information of the movable object can be utilized directly as the initial position and direction of projectile firing since the shooting course is set to be substantially coincide with the longitudinal axis of the movable object. However, the game may be set such that the movable object can be controlled separately of the direction of shooting or gun barrel. In such a case, the projectile movement computing unit 122 will determine the initial position and direction of projectile firing from the object information of the movable object and the operation signal of the gun barrel.

The hit judgment unit 126 refers and confirms the object information in the object information storage unit 104 whether or not the landform information of the enemy's future tank 500A, obstacle 80 or the second and third plateaus 76 is in an impact area of projectile which is computed by the projectile movement computing unit 122. Depending on the object information, the hit judgment unit 126 outputs a hit judgment signal.

If the enemy' future tank 500B is on the trajectory of a projectile, the hit judgment signal forms a 3-D object representing a hit on the enemy's future tank 500B, for example, a pillar of fire. More particularly, the object information storage unit 104 will store new object information (X, Y, Z, $\theta$, $\phi$, $\rho$) which represents the pillar of fire at the same position as that of the enemy's future tank 500B. At the same time, a damage in the enemy's future tank 500B is computed. If it is judged from the computation of damage that the enemy's future tank 500B has been destroyed, the object information of the enemy's future tank 500B will be erased from the object information storage unit 104. If it is judged that the enemy's future tank 500B has been deformed rather than being destroyed, the index of the object information representing the enemy's future tank 500B is changed to the other object information index representing the deformed enemy's future tank. Thus, the deformed enemy's future tank can be displayed through the image synthesizing unit 200.

If there is the obstacle 80 on the trajetory, the object information thereof is erased in the object information storage unit 104. Thus, the obstacle 80 can be destroyed by the projectile. In such a case, the landform information storage unit 106 forms the landform information of the position where the obstacle 80 had presented.

If the second or other plateau exists on the trajectory, the projectile becomes ineffective, the object information thereof being erased in the object information storage unit 104.

In such a manner, the 3-D game system can execute the game such that the player's future tank 500A is controlled to attack the enemy's future tank 500B while moving, translating and turning the player's future tank 500A in all the directions within the play field 60.

(2) Second Embodiment (Multi-Player Type Game)

FIG. 17 is a block diagram of a multi-player type game system according to the present invention.

As shown in FIG. 17, two or more consoles 11 of the same structure are provided with the corresponding number of steering information computing units 30, game space computing units 100, object information storage units 104, image synthesizing units 200 and CRTs 44, all of which have the same structures, respectively. As can be seen from FIG. 17, the object information to be stored can be shared by all the object information storage units 104 to modify the game system of the first embodiment into such a multi-player type game as shown in FIG. 5. In such a case, at least the object data of movable objects may be shared. If the game is adapted to attack enemeis with missiles, machine guns and other weapons, the object information of these projectiles is also shared. The sharing may be accomplished through communication or other means or by using a common substrate or other parts on which the object information storage units 104 are mounted.

In such a multi-player type game, however, all the 3-D objects defining a virtual 3-D game space are not necessarily shared. For example, the virtual 3-D game space viewed by the player 50A may be slightly changed to have a different layout from that of the game space viewed by the player 50B.

The game system of the second embodiment may be similarly applied to a multi-player type game different from that of FIG. 17. For example, the game system may be set such that a plurality of data groups comprising the frame data followed by the object data and polygon data shown in FIG. 15A exist for one frame or 1/60 seconds. Thus, different positions and directions of viewpoint can be set from the respective frame data in the data groups. According such a setting, a plurality of pseudo 3-D images having their different positions and directions of viewpoint can be formed through one game space computing unit 100 and one image synthesizing unit 200 within a range acceptable by the hardware. By displaying various different pseudo 3-D images having their different positions and directions of viewpoint on the respective CRTs, the 3-D game system can be realized without provision of a plurality of image synthesizing and game space computing units as shown in FIG. 17.

(3) Third Embodiment (Headset)

3-1: Headset

The third embodiment of the present invention provides a 3-D game system in which a player may wear a headset.

The headset is adapted to position a display such as liquid-crystal display in front of the player's eyes to cover his or her visual field. The headset also includes a space sensor for detecting the 3-D information of the player. A detection signal from the space sensor forms an image which is in turn displayed on the display device. Thus, the player can experience a conventional behavior such as looking-around in a virtual space with the same presence as in the real space.

Figure 18A:
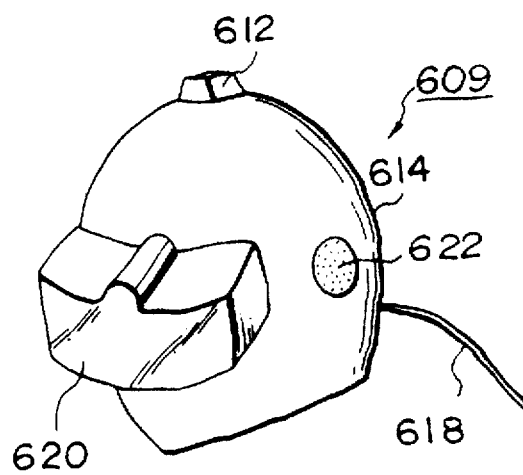
FIGS. 18A–18D are schematic views of headsets.
Figure 18C:
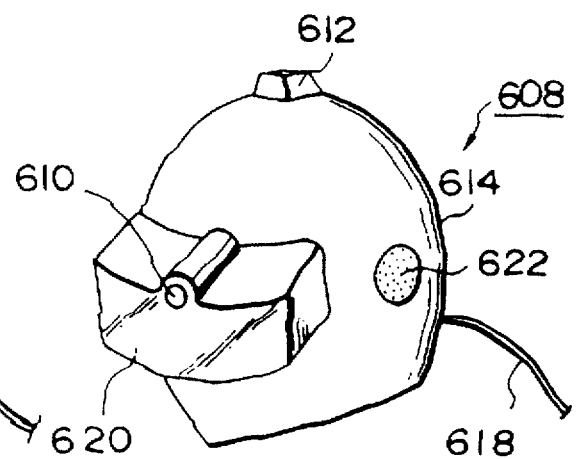
Figure 18B:
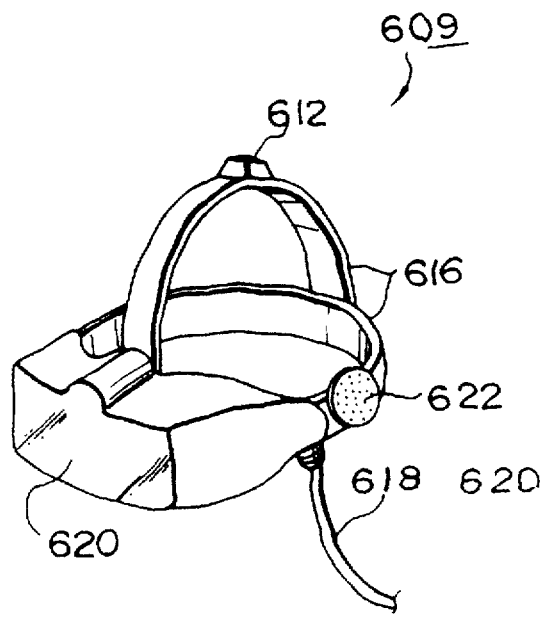

FIGS. 18A and 18B show some examples of such a headset 609.

FIG. 18A shows a headset 609 comprising a helmet 614, a space sensor 612, an image display device 620 and a speaker 622, the three later-mentioned components being mounted on the helmet 614. Since the helmet 614 can completely isolate the player from the outside when the player is wearing the helmet 614, a virtual world can be enjoyed by the player with an improved presence. On the other hand, a headset 609 shown in FIG. 18B comprises a headband 616 and a space sensor 612, image display device 620 and speaker 622 all of which are fitted integrally on the headband 616. Therefore, this headset 609 of FIG. 18B is lighter than that of FIG. 18A. According to the third embodiment, the headset may be in one of various configurations other than those of FIGS. 18A and 18B.

The image display device 620 is supported in front of the player's eyes to cover his or her visual field and displays images from the image information send from the image synthesizing unit 200 through a connecting cable 618. To reduce the size of the headset 609 and to improve the feel of fitting, it is preferable that the image display device 620 is in the form of a small-sized display such as color liquid-crystal display or small-sized Braun tube. It is also preferable that an optical system is used to do a compensation to focus on the displayed image and to widen the angle of visibility for improving the presence.

The small-sized display may be configured to provide a panoramic view by covering the player's visual field along the outline of the player's face. Alternatively, a pair of small-sized displays may be used to position in front of the respective one of the player's eyes. In the latter case, it is preferable that two-dimensional flat images provided to the player's eyes have a parallax to provide a certain 3-D image. In such an arrangement, the player can grasp the size of the displayed object and distance to it to experience a virtual world more approximating the real world.

Figure 18D:
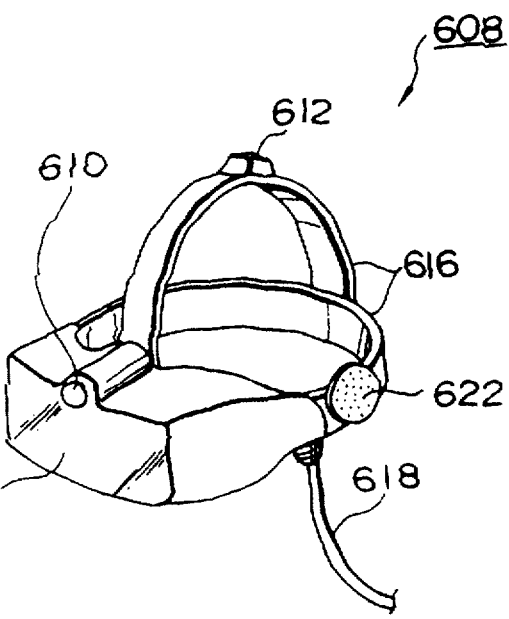
Figure 19:
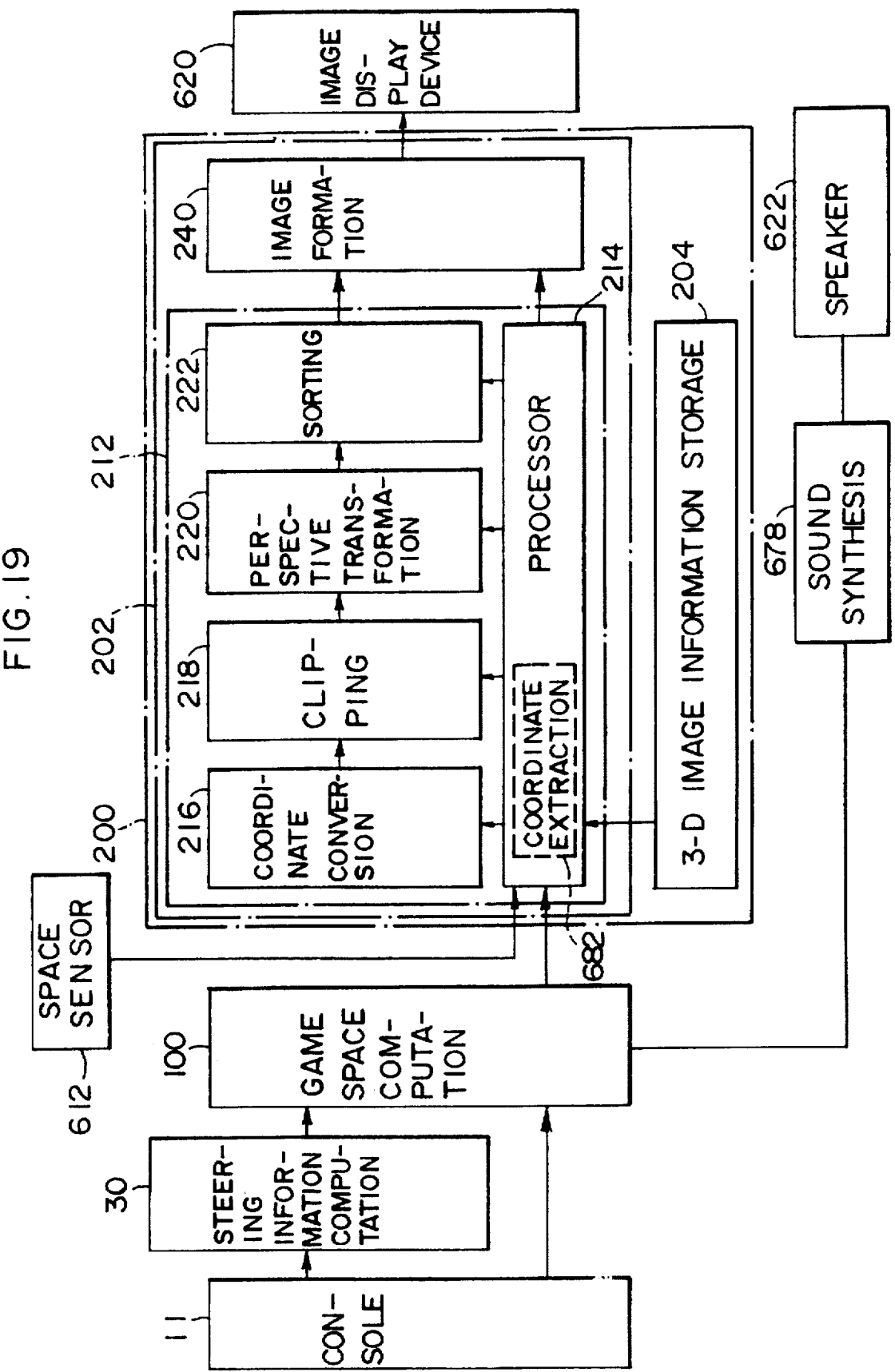
FIG. 19 is a block diagram of other embodiments of a video game system constructed in accordance with the present invention.

The space sensor 612 is one for detecting the player's 3-D information. The space sensor 612 is fitted on the player as shown in FIG. 18 and connected to the image synthesizing unit 200 through the connecting cable 618 as shown in FIG. 19. The space sensor 612 is adapted to detect the player's 3-D information from a signal which is provided by a space sensor signal generator at a given position. The player's 3-D information may be detected by that the space sensor 612 is formed by three orthogonal coils in which electric currents are induced by a magnetic field generated by the space sensor signal generator, such currents being used to detect the positional relationship.

However, the detection of 3-D information may be accomplished by any other suitable means such as static magnetic field, ultrasonic wave, infrared rays, rather than the dynamic magnetic field as described.

FIG. 19 shows an arrangement in which such a headset 609 is applied to the third embodiment.

When the headset 609 is used, the processing unit 214 in the image synthesizing unit 200 newly includes a coordinate extracting unit 682, with the other components being similar to those of the previous embodiments. The coordinate extracting unit 682 is responsive to a detection signal from the space sensor 612 to extract the position and direction of the player's viewpoint. The information is used to form a virtual field image in the position and direction of the player's viewpoint.

Figure 16:
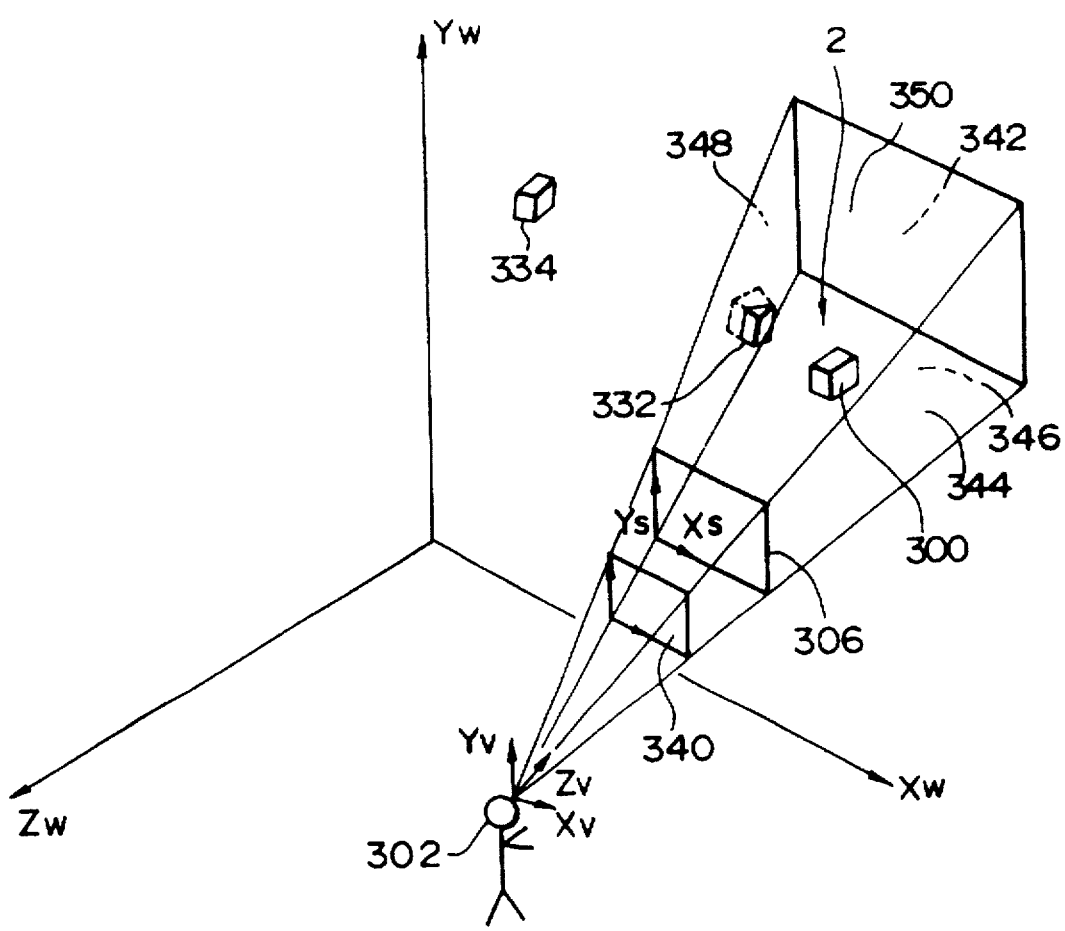
FIG. 16 is a schematic view illustrating a technique of perspective projection conversion.

The formation of virtual field image may be performed in the same manner as in the technique of FIG. 16. More particularly, the processing unit 214 reads out the object information from the game space computing unit 100 and also the corresponding 3-D image information from the 3-D image information storage unit 204. These information are used to form the data in such a format as shown in FIGS. 15A and 15B. At such a time, the position and direction information of the player's viewpoint extracted by the coordinate extracting unit 682 are contained in the frame data shown in FIG. 15A.

Next, the coordinate computing unit 216 reads out the data in this format and performs various coordinate converting and processing against the vertex coordinates. In such a case, the conversion into the viewpoint coordinate system may be performed through the position and direction information of the player's viewpoint which are contained in the frame data.

Thereafter, various processings will be carried out by the clipping processing unit 218, perspective transformation unit 220 and sorting unit 222 such that the polygon image information will be processed by the image synthesizing unit 240 to output the resulting images toward the image display device 620 in the headset 609 which the player is wearing.

In such an arrangement, the player can enjoy the game in the virtual world. More particularly, the images are reflected on the image display device 620 fitted to cover the player's visual field, rather than the conventional displays such as CRT or the like as in the prior art. The image display device 620 reflects the virtual field image in the position and direction of the player's viewpoint by using the coordinate extracting unit 682. Therefore, the player can view the field image in all the directions within the virtual 3-D space by turning the player's head with the headset 609.

As a result, for example, the player may recognize the enemy's tank attacking the player's tank when the player looks back.

Thus, the third embodiment of the present invention can form a game space more approximating the real world with great improvements in interest, presence and tension.

(4) Fourth Embodiment (Combination of Real and Virtual Space Images)

Figure 21A:
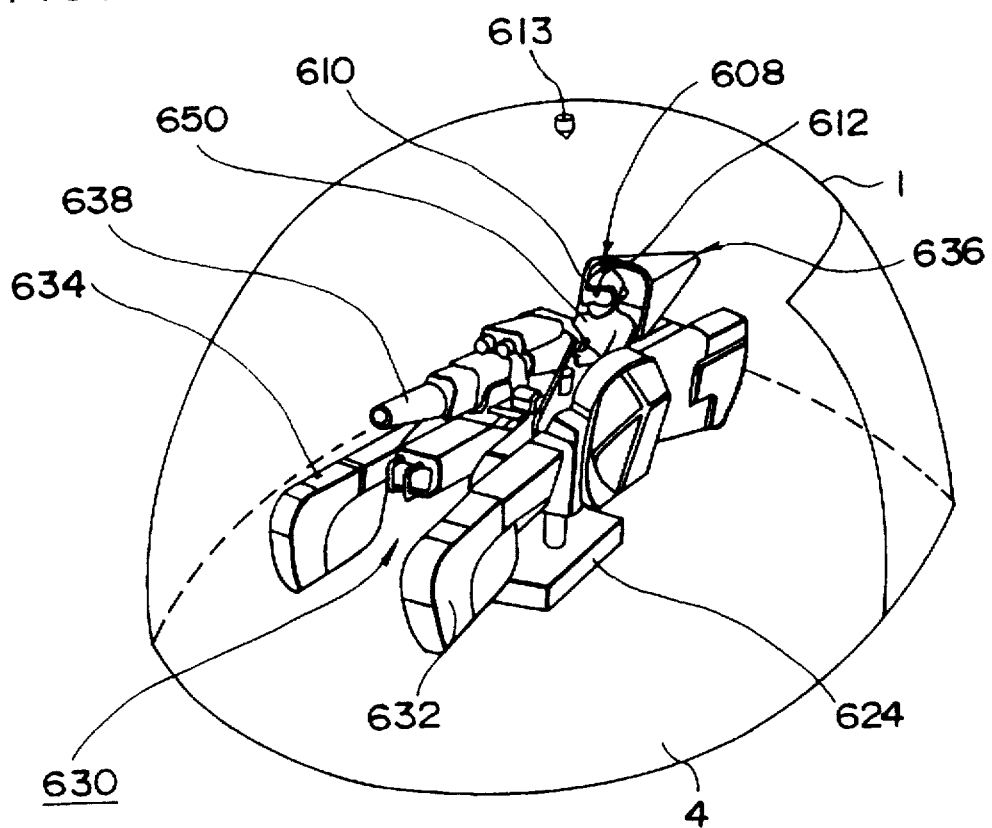
FIGS. 21A and 21B are schematic views illustrating a 3-D video game system for combining an actual space image with a virtual view image.

If in the 3-D game system using the headset, an actual space scene taken by a camera is combined with a virtual field image output from the image synthesizing unit, the 3-D game system can be realized with more improved reality. An image synthesization like this can be carried out in an arrangement as shown in FIG. 20. FIG. 21A shows the appearance of such a 3-D game system.

In FIG. 21A, a future tank 630 extremely approximating a real tank is placed on the floor 4 in a dome 1, the inside of which is fully colored with a blue color. The floor 4 is also colored with the blue color as in the inside of the dome 1. A player 650 is on the future tank 630.

The future tank 630 may comprise a driver's seat 636, left and right propulsion units 632, 634, steering levers 640, 641 and an instrument board 644. As will be described, the player 650 can observe changes in these components through a camera 610.

The instrument board 644 may include speedometer, fuel gage, warning lamp and others all of which are not illustrated. Their indications change according to the player's operation. For example, the speedometer is variable depending on the player's operation of the steering levers 640 and 641 while the fuel gage indicates the remainder of fuel. If any trouble is produced in the future tank 630 at its engine or other part, the warning lamp is turned on and off. The player 650 can know these matters through the camera 610.

The future tank 630 also includes a position control unit 624 mounted thereon at the bottom. The position control unit 624 can control the position of the future tank 630 in response to the landform information of the play field 60 with the steering signal from the player 650. Additionally, the control may be carried out to provide feels of acceleration and centrifugal force to the player, utilizing changes in position. If the future tank 630 moved past a slope 75 shown in FIG. 21B, the position control unit 624 will control the position of the future tank depending on the inclination angle of the slope. Thus, the player can experience a virtual world more approximating the real world. If the future tank 630 is moving on the landform block representing a gravel road, the position control unit 624 can finely vibrate the future tank. These position controls are executed by the game space computing unit 100 in which the control information is formed using the landform information stored in the landform information storage unit 106. Since the landform information can be reflected not only on the pseudo 3-D images, but also on the position control in such a manner, the interest of the game can be highly improved.

The player 650 wears a headset 608 that covers the visual field of the player 650. As shown in FIGS. 18C and 18D, the headset 608 newly includes a camera 610, unlike the headset 609 shown in FIGS. 18A and 18B.

The camera 610 is used to view the real world around him or her. As shown in FIGS. 18C and 18D, for example, the camera 610 is preferably located at a position near the viewpoint (eye position) of the player 650, with the angle thereof being coincide with the visual direction of the player 650. Thus, the player 650 can actually view the real world with less sense of incompatibility. The camera 610 may be any image pick-up means such as high-resolution CCD or the like.

The dome includes a space sensor signal generator 613 which co-operates with the space sensor 612 on the headset 608 to sense the 3-D information of the player.

The image synthesization of the fourth embodiment will be described below.

Figure 21B:
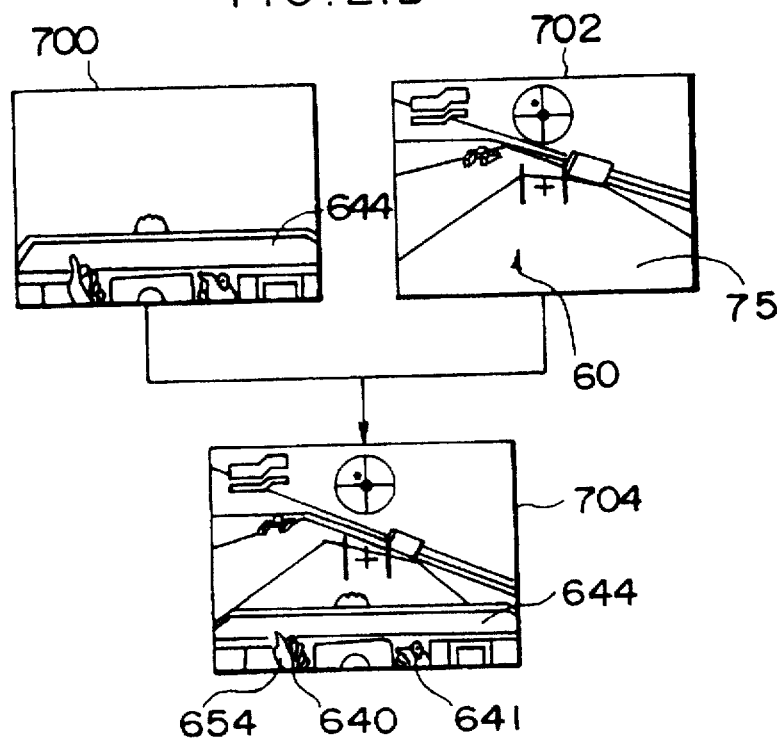

The fourth embodiment combines a real space image 700 in the real 3-D space taken by the camera 610 with a virtual field image 702 in a virtual 3-D space to form a display image 704, as shown in FIG. 21B. The display image 704 is output toward the image display device 620 through the connecting cable 618 and actually viewed by the player 650.

Such an image synthesization is carried out through the blue mat synthesization in the fourth embodiment. More particularly, all the matters other than the future tank 630 and associated parts in addition to the player 650 himself or herself, that is, the inner wall of the dome 1 and floor 4 are colored with blue color. In the real space image 700, thus, all the matters other than the future tank 630, steering levers 640, 641 and player's hands 654 become a blue-colored background. All the pixels on the blue-colored background in the real space image 700 are assigned to empty dots on which the virtual field image 702 is superimposed to provide the display image 704. In such a case, the background viewed from the player 650 is mainly reflected on the dome 1 while the road on which the future tank 630 is moving in the play field 60 is reflected on the floor 4.

FIG. 20 shows a block diagram of a 3-D game system according to the fourth embodiment. The 3-D game system newly comprises a display image synthesizing device 680 which is connected to the camera 610 and a position control unit 624 in addition to those of FIG. 19. The 3-D information of the player 650 is extracted by the space sensor 612 and coordinate extracting unit 682 and then utilized to output the virtual field image 702 viewed from the player 650 from the image forming unit 240.

Figure 22:
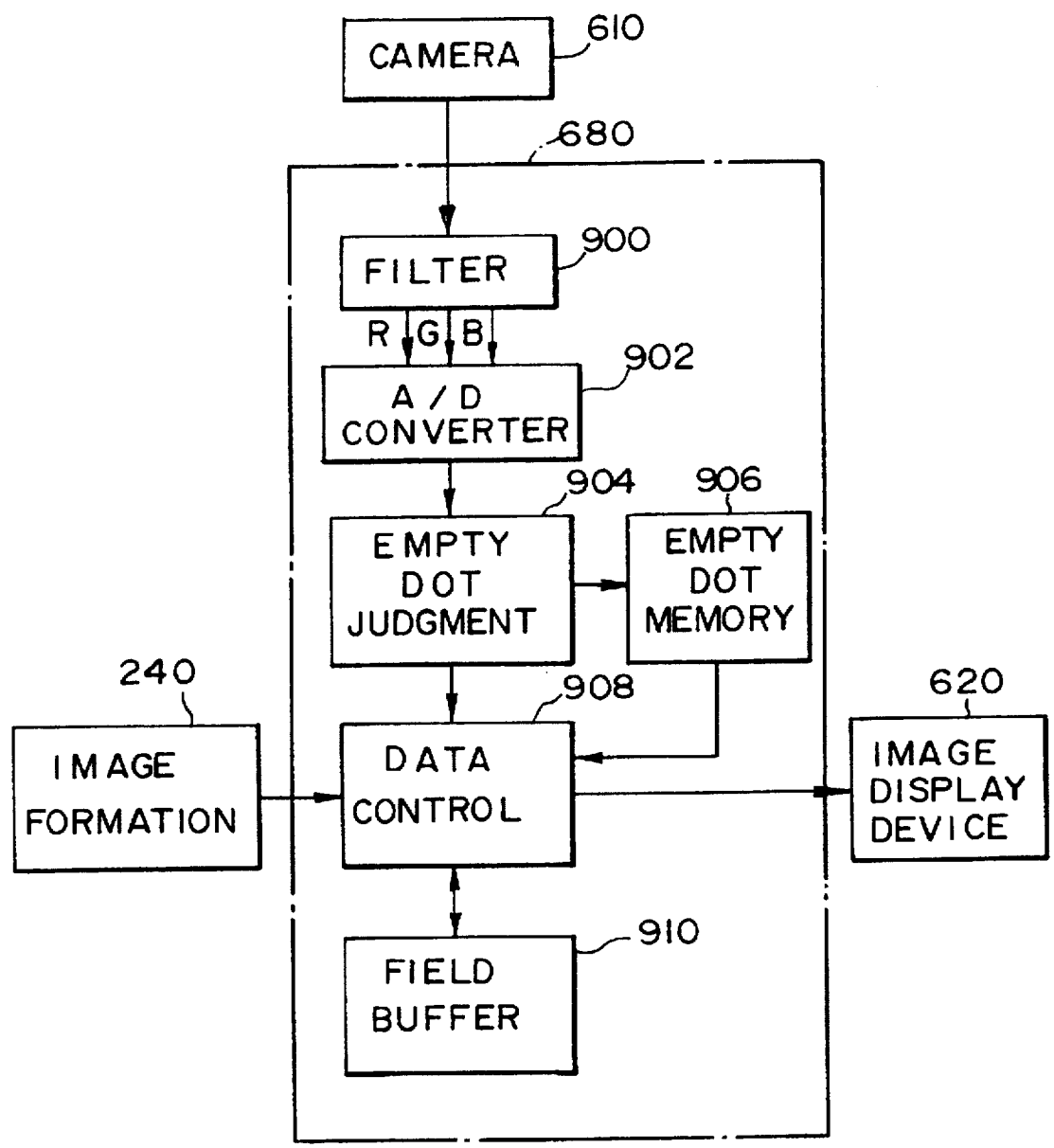
FIG. 22 is a block diagram showing the details of the display image synthesizing device.

The display image synthesizing device 680 combines the virtual field image 702 with the real space image 700 taken by the camera 610. The image synthesization may be performed by any suitable technique, but is carried out by the blue mat synthesis technique in the fourth embodiment. FIG. 22 shows the details of the display image synthesizing device 680.

In FIG. 22, the image signal representing the real space image 700 input from the camera 610 is first passed through a filter 900 in the display image synthesizing device 680 to be divided into three primary colors of R, G and B. These color components may be A/D converted into 8-bit digital data by an A/D converting circuit 902 so that 24-bit RGB digital data will be determined for every pixel. An empty dot judgment circuit 904 judges whether or not the 24-bit RGB digital data of each of the pixels in the real space image 700 is coincide with the 24-bit RGB digital data in the blue-colored inner wall of the dome 1 and floor 4. The results of judgment are written in an empty dot memory 906. The empty dot memory 906 comprises one-bit memories corresponding to all the pixels in the display image so that the empty dot judgment data of each of the pixels will be written in the corresponding one-bit memory.

The display image synthesizing device 680 further includes a field buffer 910 corresponding to the respective pixels in the display image. After the empty dot judgment data written in the empty dot memory 906 has been referred to by a data control unit 908, the real space image is written in the field buffer 910 at the respective pixel locations. In other words, the real space image will not be written in the field buffer 910 at the respective pixel locations if it is judged from the empty dot judgment data that the corresponding pixel is empty. On the contrary, the 24-bit RGB digital data of the real space image will be directly written in the respective pixel locations if it is judged that the respective one of the pixels is not empty.

The empty dot judgment data written in the empty dot memory 906 is then referred to by the data control unit 908 so that the virtual field image information computed by the image forming unit 240 will be over-written in the field buffer 910 at the respective pixel locations. More particularly, the virtual field image information will be directly written in the field buffer at the respective pixel locations if it is judged from the empty dot judgment data that the respective one of the pixels is empty. On the contrary, the virtual field image information will never been written in the field buffer 910 if it is judged from the empty dot judgment data that the respective one of the pixels is not empty. Thus, the real space image will be displayed at the empty pixel location.

Thereafter, the image information data of each of the pixel locations is read out from the field buffer 910 by the data control unit 908. The image information data is output toward the image display device 620 through the connecting cable 618 so that the player 650 can view the display image 704 comprising a combination of the real space image 700 with the virtual field image 702 in real time.

It is preferable that the write and read-out of image information are simultaneously carried out as by providing a field buffer 710 which is capable of simultaneously handling two images.

Further, the game space computing unit 100 generates a sound signal output from a speaker 622 through a sound synthesizing unit 678 and also a position control signal to the position control unit 624.

The position control may be accomplished as follows: The object information of the future tank is first changed by the object information changing unit 108 through utilization of the landform information in the landform information storage unit 106. The changed object information or object information ($X_0$, $Y_0$, $Z_0$, $\theta_0$, $\phi_0$, $\rho_0$) on which the landform information is reflected is used to generate a position control signal which is in turn output toward the position control unit 624 wherein the position control will be carried out.

According to the fourth embodiment, the player 650 can freely control the future tank 630 in the virtual 3-D space while actually viewing the behaviors of the left and right propulsion units 632, 634 and other components in the future tank 630 extremely approximating the real tank through the camera 610. This greatly improves the controllability while realizing the virtual world more approximating the real world.

The image synthesization of the display image synthesizing device 680 is not limited to the above technique, but may be accomplished by any other suitable technique such as red-color image synthesization, multi-color image synthesization and others.

(5) Other Embodiments

The present invention is not limited to the aforementioned embodiments, but may be carried out with various modifications without departing from the scope of the present invention.

Figure 23:
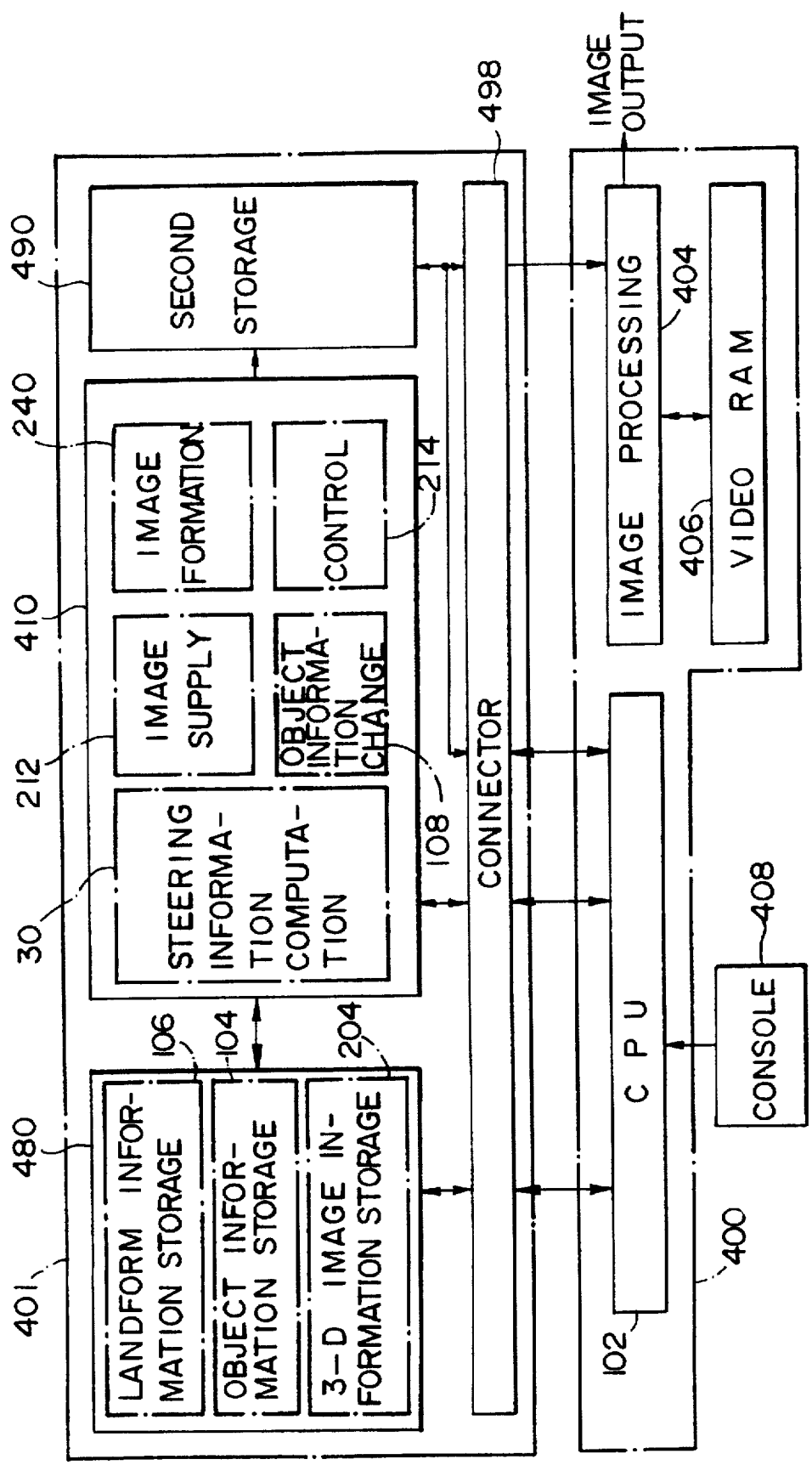
FIG. 23 is a block diagram of a household video game system to which the present invention is applied.

The 3-D game system of the present invention may be applied to various hardware arrangements, such as business-use video game systems or attraction game system as described. For example, the 3-D game system may be applied similarly to such a home-use video game system as shown in FIG. 23.

Such a home-use video game system comprises a game cartridge 401 and a game machine body 400, which are connected to each other through a connector 498. The game machine body 400 is detachably connected to a console 408 including steering levers 12, 14 and shooting button 20 in a similar way as in FIG. 2.

The game cartridge 401 comprises an auxiliary processing unit 410, a first storage unit 480 and a second storage unit 490. The first storage unit 480 has stored a game program and may be formed of nonvolatile memory, rewritable memory or the like. The first storage unit 480 also includes a landform information storage unit 106, an object information storage unit 104 and a 3-D image information storage unit 204. The auxiliary processing unit 410 comprises a steering information computing unit 30, an image supply unit 212, an image forming unit 240, an object information changing unit 108 and a control unit 214. The second storage unit 490 comprises a rewritable memory.

The home-use video game system operates substantially in the same manner as in FIG. 1. More particularly, the object and landform information stored in the first storage unit 480 is utilized with the operation signal from the console 408 by the central processing unit 102 and auxiliary processing unit 410 to set the game space or object information. The 3-D image information stored in the first storage unit 480 is utilized with the object information by the auxiliary and central processing units 410, 102 to compute a pseudo 3-D image which is in turn stored in the second storage unit 490. The stored image information is thereafter output through the image processing unit 404 and video RAM 406 if necessary.

In such an arrangement, the expensive game machine body 400 is not substantially required to be changed only with change of the auxiliary processing unit 410 in the game cartridge 401 if it is wanted to change the image synthesization technique.

Figure 24:
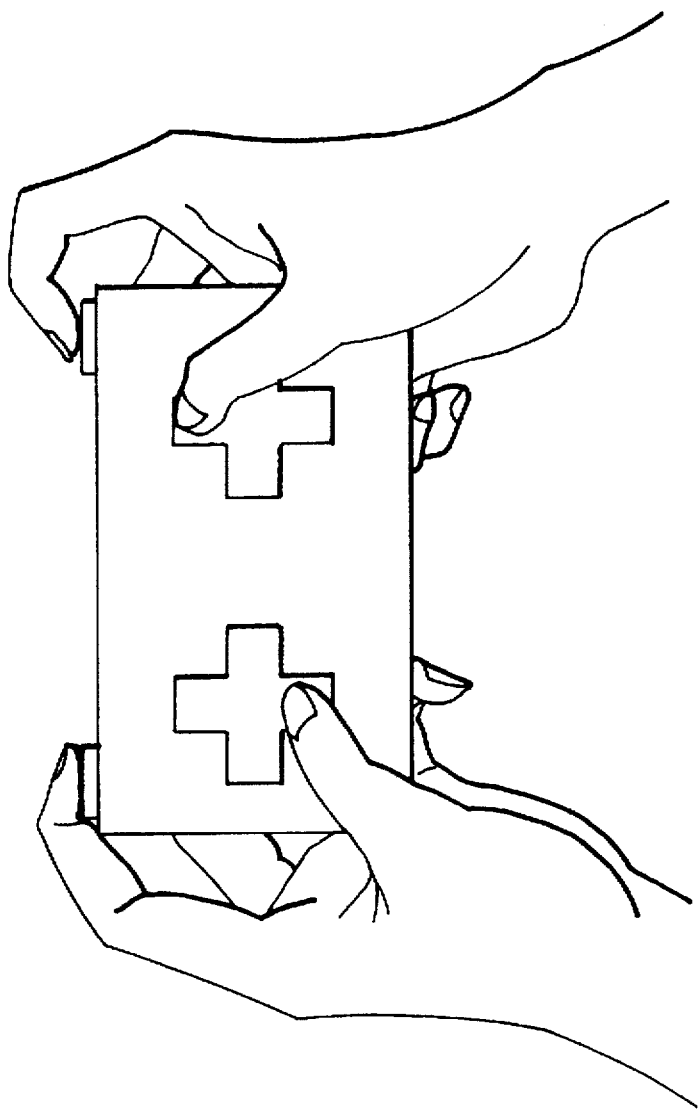
FIG. 24 is a view showing a modification of the first and second steering units.
Figure 25:
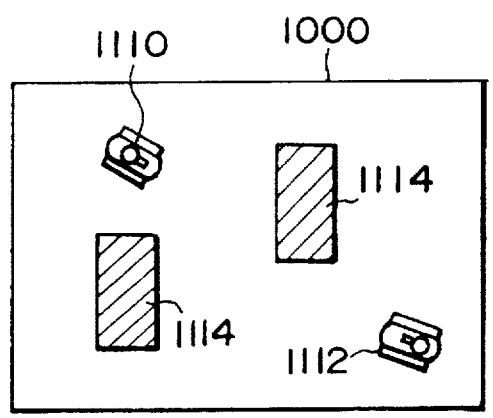
FIG. 25 is a schematic view illustrating a game scene realized by a game system according to the prior art.
Figure 26:
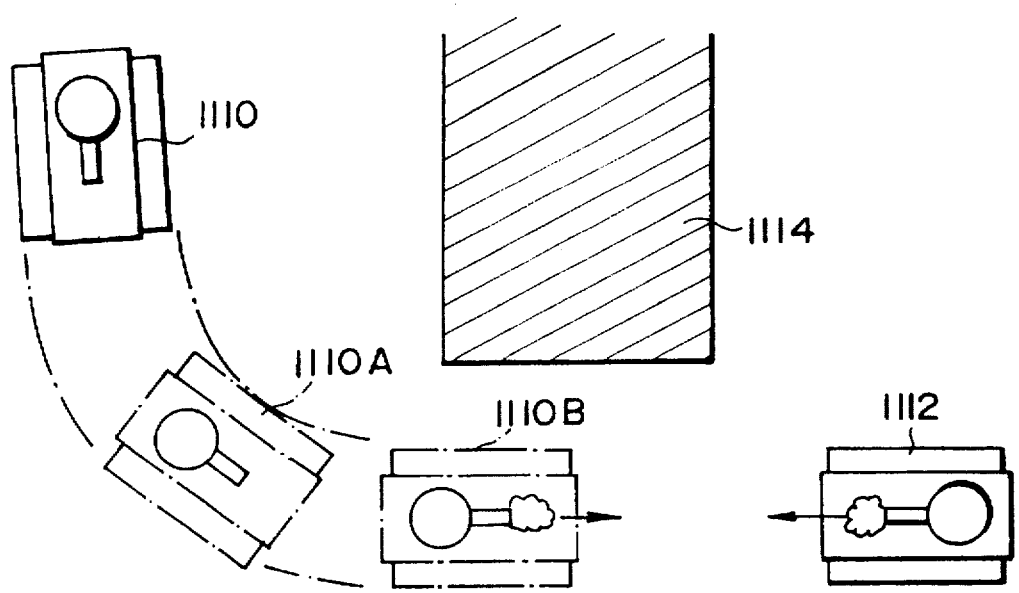
FIG. 26 is a schematic view illustrating another game scene realized by a game system according to the prior art.

Although the previous embodiments have been described as to the first and second steering levers as shown in FIG. 2, the present invention is not limited to such an arrangement of steering levers, but may be applied to such a steering mechanism as shown in FIG. 24. This steering mechanism may comprises a console body, a first cross-shaped button 12 operated by a player with his or her right hand and a second cross-shaped button 14 operated by the player with his or her left hand, as first and second steering units, the first and second cross-shaped buttons being adapted to input first and second propulsion vectors for the moviable object. The console body may include actuator buttons 22 and 24 formed therein at one side to be operated by the player's forefingers of his or her hands. These actuator buttons may be used as trigger buttons for a machine gun and missiles. Thus, the first and second steering units and shooting buttons may be taken in any one of various configurations, if necessary.

Although the previous embodiments have been described as to the fighting type viedo game system, the present invention is not limited to such a type of video game system, but may be applied to any other suitable game such as a labyrinth game in which a player moves through a compilcated labyrinth set as a 3-D game space while controlling a movable object.

We claim:

1. A video game system comprising:

steering means operated by a player for steering a movable game object, said movable game object including first and second propulsion units movable within a 360 degree range; and game computing means responsive to steering signals from said steering means for computing movement of the movable game object within a game space and for displaying the movement on a display, said steering means including:

a first steering unit adapted to be operated by a player's right hand to input a first propulsion vector $V_B$ for said first propulsion unit within the 360 degree range according to player operation;

a second steering unit adapted to be operated by a player's left hand to input a second propulsion vector $V_A$ for said second propulsion unit within the 360 degree range according to player operation; and a steering information computing unit responsive to said first and second propulsion vectors for computing and outputting propulsion and rotation information for the movable game object as steering signals, whereby the combination of right and left hand operation by the player steers said movable game object so that it will move along a curved line, rotate about a center point and translate in a forward direction, a backward direction, a lateral direction or an oblique direction within said game space depending upon relative displacement of the first and second steering units.

2. A video game system comprising:

steering means operated by a player for creating steering signals for steering a movable game object, said movable game object including first and second propulsion units movable within a 360 degree range;

shooting means operated by the player for creating actuating signals for shooting at a target; and game computing means responsive to said steering signals from said steering means and said actuating signals from said shooting means for computing the game in which the movable game object moves within a game space and can shoot at the target and for displaying the game on a display;

said steering means including:

a first steering unit adapted to be operated by a player's right hand to input a first propulsion vector for said first propulsion unit within the 360 degree range according to player operation;

a second steering unit adapted to be operated by a player's left hand to input a second propulsion vector for said second propulsion unit within the 360 degree range according to player operation; and a steering information computing unit responsive to said first and second propulsion vectors for computing and outputting directions of propulsion and rotation information for the movable game object as steering signals, whereby the combination of right and left hand operation by the player steers said movable game object so that it will move along a curved line, rotate about a center point and translate in a forward direction, a backward direction, a lateral direction or an oblique direction within said game space depending upon relative displacement of the first and second steering units to aim at the target with the help of a sight.

3. A video game system as defined in claim 2, wherein said sight for aiming at the target is displayed in front of said movable game object on the display.

4. A video game system as defined in claim 3, wherein said steering information computing unit includes a direction computing unit responsive to the first and second propulsion vectors for computing information about direction of propulsion of the movable game object and a rotation computing unit responsive to the first and second propulsion vectors for computing information about rotation of the movable game object.

5. A video game system as defined in claim 4, wherein said steering information computing unit is responsive to the first and second propulsion vectors for computing the direction and force of propulsion as said information about direction of propulsion and for computing the direction and force of rotation as said information about rotation.

6. A video game system as defined in claim 5, wherein the first and second steering units are formed to input the first and second propulsion vectors to the first and second propulsion units depending on an amount of operation.

7. A video game system as defined in claim 6, wherein the first steering unit is in the form of a first steering lever for the right hand and the second steering unit is in the form of a second steering lever for the left hand, each lever being pivotally supported for inclination from a given reference position to any direction and adapted to input a propulsion vector to the first or second propulsion unit according to the direction and amount of inclination.

8. A video game system as defined in claim 7, further comprising steering direction detector means for detecting and inputting X-axis and Y-axis coordinate components based on the direction and angle of inclination of each of said first and second steering levers from a reference point 0 when the X-axis and Y-axis represent the lateral and longitudinal directions, respectively, and for outputting first and second propulsion vectors for said first and second propulsion units, respectively, corresponding to detected X-axis and Y-axis coordinate components, and wherein said first and second propulsion units are arranged symmetrically about the movable game object, said steering information computing unit being operative to determine a center position of each of said propulsion units as the reference point 0, the lateral direction as the X-axis, and the longitudinal direction as the Y-axis and to set the directions of X-axis and Y-axis corresponding to the positive orientation in the respective steering levers as the directions of positive coordinate axes, said direction computing unit being operative to use propulsion vector velocity components $V_{XB}$, $V_{XA}$ and $V_{YB}$, $V_{YA}$ of the first and second propulsion vectors $V_B$ and $V_A$ acting on the respective propulsion units in the X-axis and Y-axis directions, to compute propulsion velocity components $V_{XO}$, $V_{YO}$ of the movable game object in the X-axis and Y-axis directions which are in turn output as information of the direction of propulsion, according to the following equations:

$$V_{XO}=V_{XA}+V_{XB}, V_{YO}=V_{YA}+V_{YB},$$

and said rotation computing unit being operative to use the absolute value, r, of the X-axis coordinate in each of the propulsion units and the first and second propulsion vectors to compute a rotation angular velocity $V_{\theta O}$ in the rotating movable game object which is in turn output as information of rotation, according to the following equation:

$$V_{\theta O}=r(V_{YA}-V_{YB}).$$

9. A video game system as defined in claim 8, wherein said game computing means comprises:

game space computing means responsive to a preset game program and the steering signals from said steering information computing unit for computing a game in which a player is to control the movable game object within a virtual three-dimensional game space; and image synthesizing means for computing a view image of the virtual 3-D game space viewed from the movable game object, and for synthesizing and displaying a pseudo 3-D image on the display, whereby the player can play a 3-D game in which the player operates the steering means and moves the movable game object within the virtual 3-D game space while viewing said pseudo 3-D image.

10. A video game system as defined in claim 9, wherein the game space computing means further comprises:

an object information storage unit for storing at least information about the 3-D position and direction of a 3-D object of said movable game object as object information, a landform information storage unit for storing information about ground landform on which the movable game object moves within the virtual 3-D space, and an object information changing unit for reading the object information of the movable game object from said object information storage unit to change the object formation by the use of the landform information read out from said landform information storage unit, and wherein said image synthesizing means comprises:

a 3-D image information storage unit for storing 3-D image information of 3-D objects for defining the game space and 3-D objects appearing in the 3-D game space; and an image computing unit for using the object information from said object information storage unit and the 3-D image information from said 3-D image information storage unit to compute view images of the game space which are viewed from the movable game object disposed in said virtual 3-D space and to synthesize said pseudo 3-D image to be output said pseudo 3-D image reflecting the landform information.

11. A video game system as defined in claim 10, wherein the movable game object is formed to launch a projectile in response to an actuating signal input by the player through the shooting means and wherein the game space computing means includes a projectile processing unit for processing the projectile launched from the movable game object, said projectile processing unit including a projectile movement computing unit responsive to the object information of the movable game object changed by said object information changing unit and also the actuating signal from said shooting means.

12. A video game system as defined in claim 11, wherein said object information storage unit is operative to store the object information of a target and wherein said projectile processing unit includes a hit judgment unit responsive to the position of the projectile computed by the projectile movement computing unit and the object information of the target stored in the object information storage unit for judging whether the projectile hits on the target.

13. A video game system as defined in claim 12, further comprising a vehicle body located in actual 3-D space for actually receiving the player, said vehicle body including a position control unit for controlling the position of the player in response to said landform information, whereby the player can virtually experience the feel as if the player boards on an actual vehicle which reflects the landform information.

14. A video game system as defined in claim 13, further comprising a player space sensor for sensing 3-D information about the player within the actual 3-D space and wherein said display is formed to cover the visual field of view of the player and to be mounted on the head of the player, said image synthesizing means including a coordinate extracting unit responsive to a detection signal from said player space sensor for extracting the position and direction information of the player within the virtual 3-D game space, whereby the view images of the player within the virtual 3-D game space can be computed to display the pseudo 3-D image on said display.

15. A video game system as defined in claim 14, further comprising image pick-up means on the player for detecting actual space image viewed by the player and wherein said image synthesizing means includes a display image synthesizing unit for combining the view images of the player within the virtual 3-D space with the actual space image detected by said image pick-up means, whereby a pseudo 3-D image formed from these combined images can be displayed on said display.

16. A video game system comprising:

steering means operated by a player for steering a movable game object, said movable game object including first and second propulsion units arranged symmetrically about the movable game object and movable within a 360 degree range;

game computing means responsive to steering signals from said steering means for computing movement of the movable game object within a game space and for displaying the movement on a display;

said steering means including:

a first steering unit adapted to be operated by a player's right hand to input a first propulsion vector $V_B$ for said first propulsion unit within the 360 degree range according to player operation, the first steering unit being in the form of a first steering lever for the right hand;

a second steering unit adapted to be operated by a player's left hand to input a second propulsion vector $V_A$ for said second propulsion unit within the 360 degree range according to player operation, the second steering unit being in the form of a second steering lever for the left hand;

wherein each lever is pivotally supported for inclination from a given reference position to any direction and adapted to input a propulsion vector to the first or second propulsion unit according to the direction and amount of inclination;

steering direction detector means for detecting and inputting X-axis and Y-axis coordinate components based on the direction and angle of inclination of each of said first and second steering levers from a reference point 0 when the X-axis and Y-axis represent the lateral and longitudinal directions, respectively, and for outputting first and second propulsion vectors for said first and second propulsion units, respectively, corresponding to detected X-axis and Y-axis coordinate components;

a steering information computing unit responsive to said first and second propulsion vectors for computing and outputting propulsion and rotation information for the movable game object as steering signals, said steering information computing unit including a direction computing unit responsive to the first and second propulsion vectors for computing information about direction of propulsion of the movable game object and a rotation computing unit responsive to the first and second propulsion vectors for computing information about rotation of the movable game object, said steering information computing unit being operative to determine a center position of each of said propulsion units as the reference point 0, the lateral direction as the X-axis, and the longitudinal direction as the Y-axis and to set the directions of X-axis and Y-axis corresponding to the positive orientation in the respective steering levers as the directions of positive coordinate axes, said direction computing unit being operative to use propulsion vector velocity components $V_{XB}$, $V_{XA}$ and $V_{YB}$, $V_{YA}$ of the first and second propulsion vectors $V_B$ and $V_A$ acting on the respective propulsion units in the X-axis and Y-axis directions, to compute propulsion velocity components $V_{XO}$, $V_{YO}$ of the movable game object in the X-axis and Y-axis directions which are in turn output as information of the direction of propulsion, according to the following equations:

$$V_{XO}=V_{XA}+V_{XB}, V_{YO}=V_{YA}+V_{YB},$$

said rotation computing unit being operative to use the absolute value, r, of the X-axis coordinate in each of the propulsion units and the first and second propulsion vectors to compute a rotation angular velocity $V_{QO}$ in the rotating movable game object which is in turn output as information of rotation, according to the following equation:

$$V_{QO} = r(V_{YA} - V_{YB});$$

whereby the combination of right and left hand operations by the player steers said movable game object so that it will move along a curved line, rotate about a center point and translate in a forward direction, a backward direction, a lateral direction or an oblique direction within said game space depending upon relative displacement of the first and second steering units.

* * * * *